United States Patent
Kajihara

(10) Patent No.: US 7,366,350 B2
(45) Date of Patent: Apr. 29, 2008

(54) IMAGE PROCESSING APPARATUS AND METHOD

(75) Inventor: Tamotsu Kajihara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 838 days.

(21) Appl. No.: 10/722,957

(22) Filed: Nov. 26, 2003

(65) Prior Publication Data

US 2004/0156544 A1    Aug. 12, 2004

(30) Foreign Application Priority Data

Nov. 29, 2002  (JP) .............................. 2002-348384
Nov. 6, 2003   (JP) .............................. 2003-376443

(51) Int. Cl.
*G06G 9/00* (2006.01)

(52) U.S. Cl. ........................ 382/167; 382/162; 358/518

(58) Field of Classification Search ..................... None
See application file for complete search history.

(56) References Cited

U.S. PATENT DOCUMENTS

| | | | |
|---|---|---|---|
| 6,406,826 B1 | 6/2002 | Suzuki et al. | |
| 6,432,590 B1 | 8/2002 | Ueda et al. | |
| 6,996,270 B1* | 2/2006 | Ito ............................. | 382/167 |
| 7,020,330 B2* | 3/2006 | Schroder et al. ............ | 382/167 |
| 2001/0005222 A1* | 6/2001 | Yamaguchi ................. | 348/223 |
| 2001/0012399 A1* | 8/2001 | Tohyama et al. ........... | 382/167 |
| 2002/0021360 A1* | 2/2002 | Takemoto ................... | 348/222 |

FOREIGN PATENT DOCUMENTS

| | | |
|---|---|---|
| JP | 2000242775 | 9/2000 |
| JP | 2001186323 | 7/2001 |

OTHER PUBLICATIONS

"Picture Segmentation Using A Recursive Segmentation Splitting Method" by Ron Ohlander et al., Computer Graphics and Image Proc., pp. 313-333 (1978).
"Structured Description of Color-Image Data Region Splitting" by Yu-ichi Ota, Takeo Kanade, and Toshiyuki Sakai, Information Processing, Information Processing Society of Japan, Dec. 1978. vol. 19 No. 12, pp. 1130-1136.
"Color Appearance Models," M.D. Fairchild, Addison-Wesley, 1998.
"Study on characteristics of memory color (1)," Kazuyuki Natori and Gentarow Ohmi, Color Study, the Color Science Association Of Japan, 2000.

* cited by examiner

*Primary Examiner*—Jingge Wu
*Assistant Examiner*—Sean Motsinger
(74) *Attorney, Agent, or Firm*—Cooper & Dunham, LLP

(57) ABSTRACT

An apparatus for performing image processing on image data including a memory color includes: a characteristic value calculation part calculating a characteristic value from the image data; an area extraction part extracting a specific color area and its background area from the image data, using the characteristic value and the color information of the memory color stored in a storage part; a target value calculation part calculating a target value for correcting the preferable color of the specific color from the characteristic value, the extracted specific color and background areas, and the color information of the preferable color; and an image data correction part calculating a correction for correcting the preferable color based on the calculated target value and the characteristic value, and correcting a color of the specific color area based on the calculated correction and the characteristic value.

12 Claims, 18 Drawing Sheets

| AREA | $L^*_{ave}$ | $a^*_{ave}$ | $b^*_{ave}$ | $\Delta S[\%]$ |
|---|---|---|---|---|
| $H_1$ | 63.41 | 3.259 | −17.3 | 29.5 |
| $H_2$ | 70.19 | 4.715 | −2.95 | 2.2 |
| $H_3$ | 21.61 | 12.94 | 13.13 | 14.4 |
| $H_4$ | 66.63 | 10.03 | 15.38 | 26 |
| $H_5$ | 69.32 | 20.25 | 19.53 | 10.2 |
| ⋮ | ⋮ | ⋮ | ⋮ | ⋮ |
| $H_h$ | * | * | * | * |

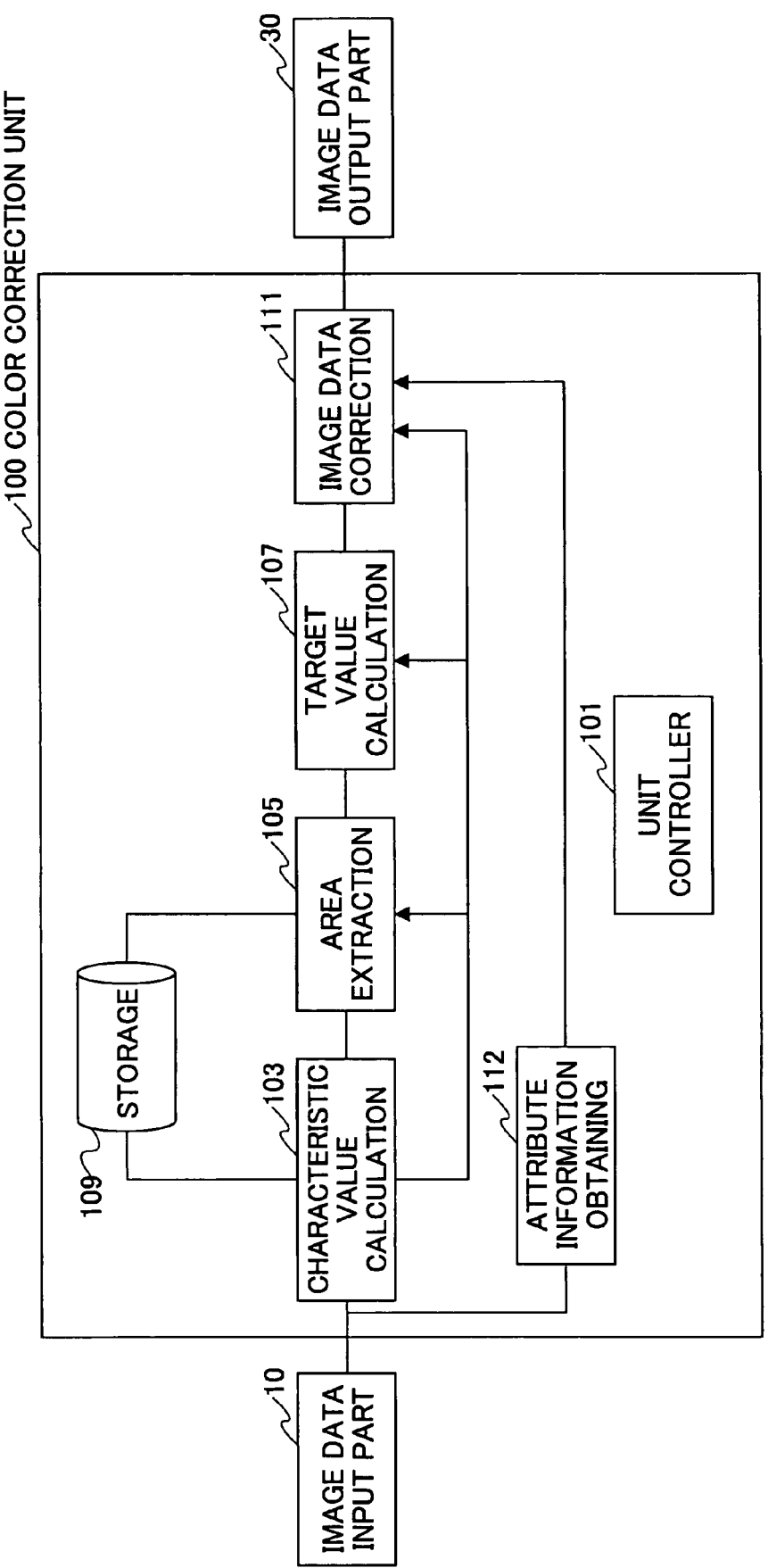

FIG.10

| CLASSIFICATION | TAG NAME | TAG NO. (HEX) |
|---|---|---|
| A.<br>VERSION | Exif VERSION<br>/SUPPORTED FLASHPIX VERSION | 9000<br>/A0000 |
| B.<br>IMAGE DATA<br>CHARACTERISTICS | COLOR SPACE INFORMATION | A0001 |
| C.<br>CONFIGURATION | MEANING OF EACH COMPONENT<br>/IMAGE COMPRESSION MODE<br>/VALID IMAGE WIDTH<br>/VALID IMAGE HEIGHT | 9101<br>/9102<br>/A002<br>/A003 |
| D.<br>USER<br>INFORMATION | MANUFACTURER NOTES<br>USER COMMENTS | 37500<br>/37510 |
| E.<br>RELATED FILE | RELATED AUDIO FILE | 40964 |
| F.<br>DATE AND TIME | DATE AND TIME OF ORIGINAL<br>DATA GENERATION<br>/DATE AND TIME OF DIGITAL<br>DATA GENERATION<br>··· ETC. | 36867<br>/36868<br>··· |
| G.<br>PICTURE-TAKING<br>CONDITIONS | EXPOSURE TIME<br>/F NUMBER<br>/SHUTTER SPEED<br>/WHITE BALANCE<br>/SCENE CAPTURE TYPE<br>/FLASH<br>··· | 33434<br>/33437<br>/37377<br>/41987<br>/41990<br>/37385<br>··· |

FIG.11

| SCENE CAPTURE TYPE | TYPE | $\alpha_{SCENE}$ |
|---|---|---|
| STANDARD | 0 | 1.00 |
| LANDSCAPE | 1 | 0.80 |
| PORTRAIT | 2 | 1.30 |
| NIGHT SCENE | 3 | 0.00 |
| OTHER | RESERVED | RESERVED |

FIG.21

| SCENE CAPTURE TYPE | TYPE | CORRECTION FACTOR |
|---|---|---|
| STANDARD | 0 | 0.10 |
| LANDSCAPE | 1 | 0.20 |
| PORTRAIT | 2 | 0.50 |
| NIGHT SCENE | 3 | 0.00 |
| ⋮ | ⋮ | ⋮ |

IMAGE PROCESSING APPARATUS AND METHOD

BACKGROUND OF THE INVENTION

1. Field of the Invention

The present invention generally relates to image processing apparatuses and image processing methods, and more particularly to an image processing apparatus and an image processing method for processing image data including a memory color, a program causing a computer to execute such a method, and a computer-readable recording medium on which such a program is recorded.

2. Description of the Related Art

Progress in digital technology has made it common to output image data input through input apparatuses such as a digital camera and a network scanner from output apparatuses such as an ink-jet printer, a laser printer, and a digital proofer. Generally, image data input from an image data input apparatus is subjected to a variety of processing by an image processing apparatus or an image processing method causing the image processing apparatus to operate, and is output.

Under such circumstances, a variety of images are processed so that a wide variety of requests as to image quality have been made to image data. Particularly, the reproduction of colors referred to as memory colors such as skin color (skin tones), grass green, and sky blue, which are frequently seen in our daily life, is considered to be important.

Particularly, the skin color of a human image is an image quality factor that attracts the most attention. Accordingly, techniques for correcting the skin color of a human image to an appropriate color have been disclosed.

For instance, according to Japanese Laid-Open Patent Application No. 2000-242775 (Prior Art 1), a facial area is extracted from an image including a man, and color density information representing color and/or density (color density) around the facial area is detected. The color density of the facial area is adjusted based on the color density information. The adjusted image is reproduced so that the facial area of an appropriate color density unaffected by the color density around the facial area is perceived.

Meanwhile, according to Japanese Laid-Open Patent Application No. 2001-186323 (Prior Art 2), a skin-colored area is extracted from a human image included in image data, and the skin color of the extracted skin-colored area is compared with a prepared skin color correction target value to calculate a skin color correction. The color of the skin-colored area of the human image is corrected based on the calculated skin color correction. Thereby, the skin color of a man in an identification photograph can be made closer to an actual skin color.

Further, it is well know that in recognizing the color and the density of a certain area, human vision is affected by color and density around the area, as described, for instance, in "Color Appearance Model," M. D. Fairchild, ADDISON-WESLEY, 1998. That is, even if the density of an area remains the same, the area seems bright if it is dark around the area, and the area seems dark if it is bright around the area.

For instance, when areas of the uniform gray density are observed against a background having the same gray density as those areas, those areas are perceived as having the same density. On the other hand, when the areas are observed against black and white, respectively, the areas are perceived as having different densities depending on their respective background colors.

Accordingly, even when only a skin-colored area is processed to have an appropriate color and density as described in Prior Art 2, a perceived facial area may be affected by the color and the density of the peripheral area to have an inappropriate color and density.

Further, according to Prior Art 1, the color and the density of a skin-colored area is appropriately corrected considering the color and the density of its peripheral area. However, a preferable color is prevented from being reproduced in some cases.

For instance, in the case of an image in which a skin-colored area exists in a preferable range as a whole and its peripheral area is tinged with blue as a whole, color correction to reduce blueness, that is, add yellowness, is performed on the entire image so as to perform correction to balance chromaticness over the entire image (so-called white balance correction).

The same color correction is performed on the skin-colored area so that the color of the skin-colored area may be offset from the center of a preferable skin color. A description is given, with reference to FIG. 1, of this problem.

FIG. 1 is a diagram for illustrating color correction according to Prior Art 1. In FIG. 1, a skin-colored area and an area of a color other than a skin color (hereinafter referred to as a background area) that are extracted from image data are plotted in the CIELAB uniform color space.

Referring to FIG. 1, the psychometric chroma coordinates of chromaticness are shown two-dimensionally. The horizontal axis represents chromaticness in the red-green direction ($a^*$), and the vertical axis represents chromaticness in the yellow-blue direction ($b^*$). Point S represents the skin-colored area of the image data before correction, and Point $R_1$ represents the chromaticness of the background area before correction. It is assumed that the chromaticness of the skin-colored area of the image data exists in a preferable skin-color range (indicated by hatching). Naturally, in this case, the skin-colored area (point S) is perceived as a preferable skin color.

However, in the case of image data tinged with blue over the entire image whose background area before correction is indicated by Point $R_2$, correction to reduce blueness is performed on the entire image. Accordingly, correction to add yellowness to the entire image data is performed on the entire image. As a result, referring to FIG. 1, the background area is corrected from Point $R_2$ to Point $R_2'$.

Meanwhile, the same color correction is performed on the image data of the skin-colored area so that the skin-colored area is corrected from Point S to Point S'. That is, although the colors are balanced over the entire image, the color of the skin-colored area is slightly more yellowish than a preferable skin color in the obtained image. That is, the skin-colored area of this image data is not perceived as a preferable skin color.

SUMMARY OF THE INVENTION

Accordingly, it is a general object of the present invention to provide an image processing apparatus and method in which the above-described disadvantage is eliminated.

A more specific object of the present invention is to provide an image processing apparatus and method that can correct the color of a memory color in image data in accordance with the peripheral area of the memory color and the characteristics of the image data so that a color perceived as preferable is always obtained.

Another more specific object of the present invention is to provide a program for causing a computer to execute such a method, and a computer-readable recording medium on which such a program is recorded.

One or more of the above objects of the present invention are achieved by an apparatus for performing image processing on image data including a memory color, including: a characteristic value calculation part calculating a characteristic value from the image data; an area extraction part extracting a specific color area of a specific color and a background area thereof from the image data, using the characteristic value and color information of the memory color stored in a storage part; a target value calculation part calculating a target value for correcting a preferable color of the specific color from the characteristic value, the extracted specific color and background areas, and color information of the preferable color stored in the storage part; and an image data color correction part calculating a correction for correcting the preferable color based on the calculated target value and the characteristic value, and correcting a color of the specific color area based on the calculated correction and the characteristic value.

One or more of the above objects of the present invention are also achieved by an apparatus for performing image processing on image data including a memory color, including: an area extraction part extracting a specific color area of a specific color and a background area thereof from the image data, using color information of the memory color stored in a storage part; a characteristic value calculation part calculating a characteristic value of at least one of the specific color area and the background area; a target value calculation part calculating a target value and a correction for correcting a preferable color of the specific color from a result of the calculation by the characteristic value calculation part and color information of the preferable color stored in the storage part; and an image data correction part correcting a color of the specific color area based on the correction calculated by the target value calculation part.

One or more of the above objects of the present invention are also achieved by an apparatus for performing image processing on image data including a human image, including: an area extraction part extracting an area of a skin color and a background area thereof from the image data, using color information of a memory color stored in a storage part; a characteristic value calculation part calculating a characteristic value of at least one of the area of the skin color and the background area; a target value calculation part calculating a target value and a correction for correcting a preferable color of the skin color from a result of the calculation by the characteristic value calculation part and color information of the preferable color stored in the storage part; and an image data correction part correcting a color of the area of the skin color based on the correction calculated by the target value calculation part.

One or more of the above objects of the present invention are achieved by a method of performing image processing on image data including a memory color, the method including the steps of: (a) calculating a characteristic value from the image data; (b) extracting a specific color area of a specific color and a background area thereof from the image data, using the characteristic value and color information of the memory color stored in a storage part; (c) calculating a target value for correcting a preferable color of the specific color from the characteristic value, the extracted specific color and background areas, and color information of the preferable color stored in the storage part; and (d) calculating a correction for correcting the preferable color based on the calculated target value and the characteristic value, and correcting a color of the specific color area based on the calculated correction and the characteristic value.

One or more of the above objects of the present invention are also achieved by a method of performing image processing on image data including a memory color, including the steps of: (a) extracting a specific color area of a specific color and a background area thereof from the image data, using color information of the memory color stored in a storage part; (b) calculating a characteristic value of at least one of the specific color area and the background area; (c) calculating a target value and a correction for correcting a preferable color of the specific color from a result of the calculation by the step (b) and color information of the preferable color stored in the storage part; and (d) correcting a color of the specific color area based on the correction calculated by the step (c).

One or more of the above objects of the present invention are also achieved by a method of performing image processing on image data including a human image, including the steps of: (a) extracting an area of a skin color and a background area thereof from the image data, using color information of a memory color stored in a storage part; (b) calculating a characteristic value of at least one of the area of the skin color and the background area; (c) calculating a target value and a correction for correcting a preferable color of the skin color from a result of the calculation by the step (b) and color information of the preferable color stored in the storage part; and (d) correcting a color of the area of the skin color based on the correction calculated by the step (c).

One or more of the above objects of the present invention are also achieved by a program for causing a computer to execute a method according to the present invention.

One or more of the above objects of the present invention are further achieved by a computer-readable recording medium on which a program for causing a computer to execute a method according to the present invention is recorded.

BRIEF DESCRIPTION OF THE DRAWINGS

Other objects, features and advantages of the present invention will become more apparent from the following detailed description when read in conjunction with the accompanying drawings, in which:

FIG. 9 is a block diagram showing a functional configuration of the image processing apparatus according to a second embodiment of the present invention;

FIG. 10 is a diagram showing an Exif-based file structure storing the attribute information of the original image data according to the second embodiment of the present invention;

FIG. 11 is a diagram showing a correction factor table corresponding to a scene capture type according to the second embodiment of the present invention;

FIG. 21 is a diagram showing a correction factor table corresponding to a scene capture type according to the fourth embodiment of the present invention.

DETAILED DESCRIPTION OF THE PREFERRED EMBODIMENTS

A description is given, with reference to the accompanying drawings, of embodiments of the present invention.

First Embodiment

Figure 1:
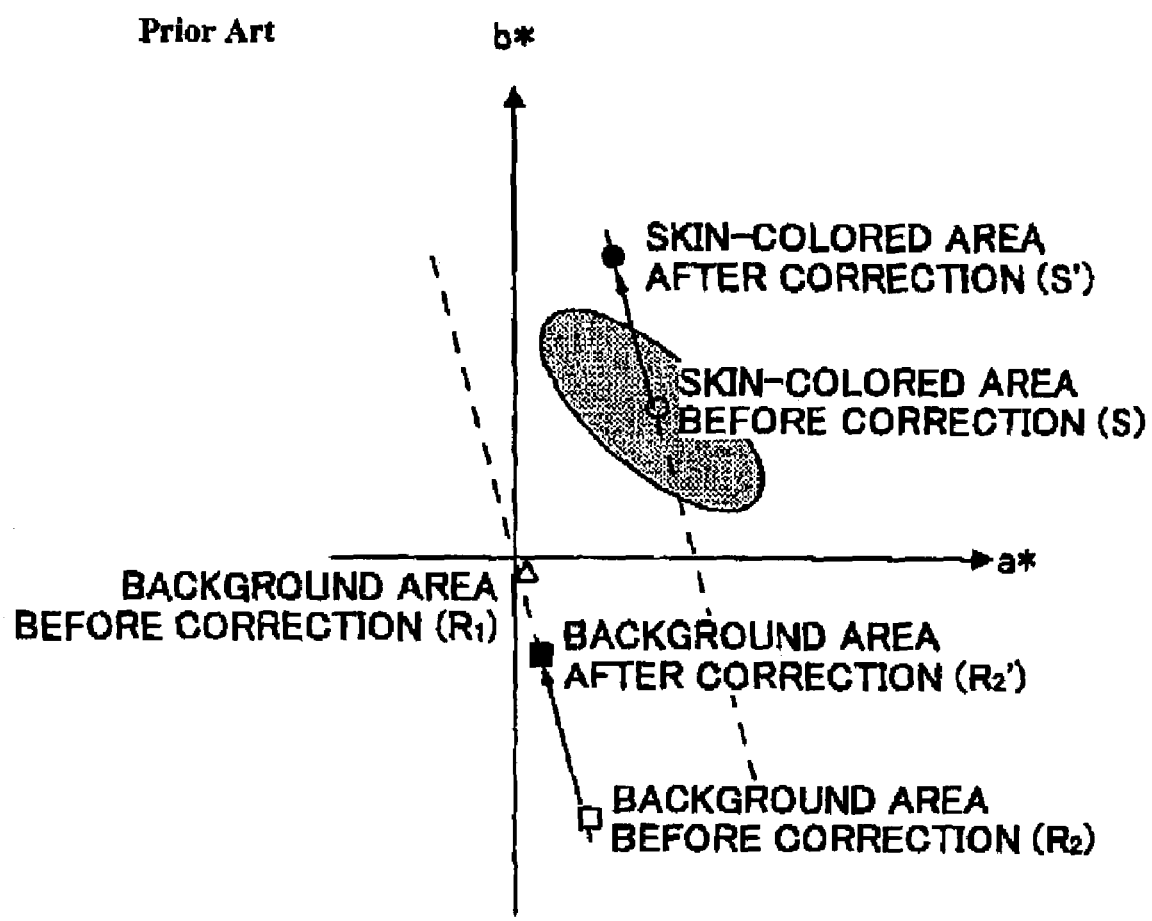
FIG. 1 is a diagram for illustrating a problem in the correction of a preferable skin color according to prior art.
Figure 2:
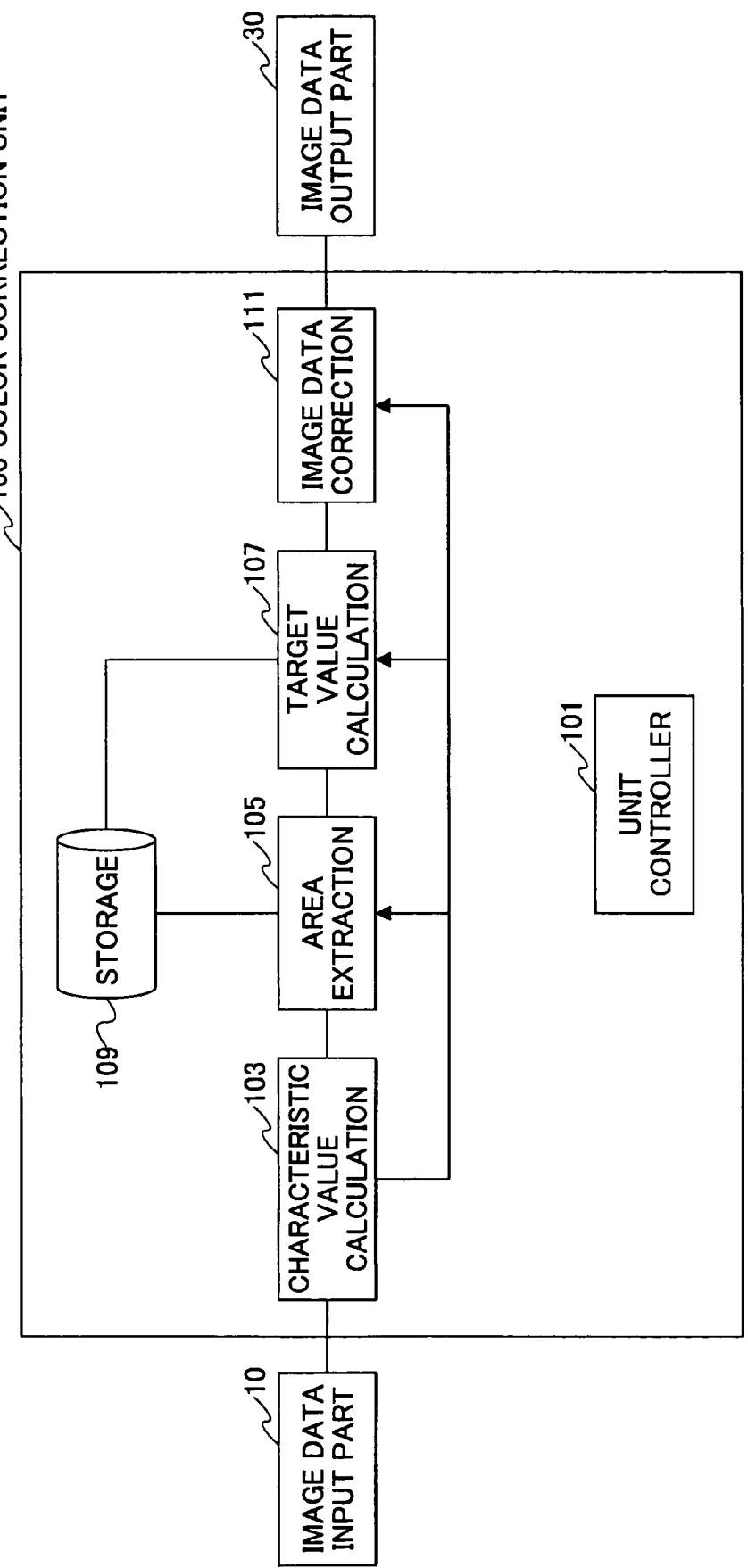
FIG. 2 is a block diagram showing a functional configuration of an image processing apparatus according to a first embodiment of the present invention.

FIG. 2 is a block diagram showing a functional configuration of an image processing apparatus according to a first embodiment of the present invention. Referring to FIG. 2, image data is input from an image data input part 10, subjected to color correction in a color correction unit 100, and output from an image data output part 30.

The color correction unit 100 includes a unit controller 101, a characteristic value calculation part 103, an area extraction part 105, a target value calculation part 107, a storage part 109, and an image data correction part 111.

The unit controller 101 controls the entire color correction unit 100. The characteristic value calculation part 103 calculates the characteristic values of the image data input from the image input part 10, which is hereinafter also referred to as the original image data, and outputs the characteristic value table of the original image data. The area extraction part 105 extracts a specific color area to be subjected to color correction and its background area included in the original image data, referring to the color information of a memory color stored in the storage part 109. The target value calculation part 107 calculates the target value of a preferable color after color correction for the specific color from the color information of the extracted specific color area and background area and preferable color information for the specific color obtained from the storage part 109. The image data correction part 111 calculates a correction (amount) in accordance with the calculated target value of the preferable memory color and characteristic values obtained from the characteristic value table of the original image data. Then, the image data correction part 111 obtains image data by performing color correction on the original image data by the calculated amount. The obtained image data is hereinafter also referred to as corrected image data.

The image data input part 10 may be connected to a network such as the Internet through a network interface provided to the image processing apparatus so that image data can be input from outside via the network. Alternatively, image data may be input from apparatuses connected to the image processing apparatus, such as a hardware disk drive, a flexible disk drive, an optical recording medium reader, a scanner, and a digital camera.

When the input image data is an analog signal, the image data input part 10 converts the input image data into a digital signal. Then, the image data input 10 performs predetermined digital processing on the input image data, and outputs the image data to the color correction unit 100 as digital signals of R (red), G (green), and B (blue).

In this embodiment, the RGB color space is employed for the input signal, and the Lab color space is used for characteristic value calculation and area extraction. However, the present invention is not limited to these color spaces, and may also employ the YCC color space or the Luv color space.

The storage part 109 stores the chromaticity information of memory colors and the color information of a preferable color (preferable color information) for each memory color. The chromaticity information is stored as extraction conditions for extracting a specified memory color from the original image data. The memory colors are colors memorized by a man, such as the colors of skin, sky, ocean, river, grass and trees, and snow.

Next, a description is given of a method of setting the color of skin (skin color) of those memory colors, and a method of setting the color information of a preferable skin color.

Method of Setting a Skin Color:

As a method of setting a skin color, for instance, such ranges as defined in "Skin Tone Color" by Japan Color Research Institute may be prestored as follows:

Hue (H): 1YR~9YR
Chroma (C): 3, 4, and 5
Value (V): 4.0~8.5

The value of HV/C employed herein is converted into HV/C ($HVC_{JIS}$) and the corresponding xy chromaticity coordinates by:

$$x_{JIS}=f(H_{JIS}, V_{JIS}, C_{JIS})$$

$$y_{JIS}=f(H_{JIS}, V_{JIS}, C_{JIS})$$

$$V_{JIS}=V_{JIS} \quad (1)$$

as illustrated in "Colour specification-Specification according to their three attributes" in JIS (Japanese Industrial Standards Z 8721.

Next, values in an appropriate uniform color space are obtained from the obtained x, y, and V ($xy_{JIS}$) coordinates by:

$$X = \frac{x_{JIS}}{y_{JIS}} \cdot V_{JIS}$$

$$Y = V_{JIS} \quad (2)$$

$$Z = \frac{1-x_{JIS}-y_{JIS}}{y_{JIS}} \cdot V_{JIS}$$

$$L^* = 116 \cdot \left(\frac{Y}{Y_n}\right)^{\frac{1}{3}} - 16 = 116 \cdot 7.787 \cdot \left(\frac{Y}{Y_n} + \frac{16}{116}\right) - 16 \quad (3)$$

$$a^* = 500 \cdot \left\{ f\left(\frac{X}{X_n}\right) - f\left(\frac{Y}{Y_n}\right) \right\}$$

$$b^* = 200 \cdot \left\{ f\left(\frac{Y}{Y_n}\right) - f\left(\frac{Z}{Z_n}\right) \right\}$$

$$f\left(\frac{T}{T_n}\right) = \left(\frac{T}{T_n}\right)^{\frac{1}{3}} = 7.787 \cdot \left(\frac{T}{T_n} + \frac{16}{116}\right)$$

Figure 3:
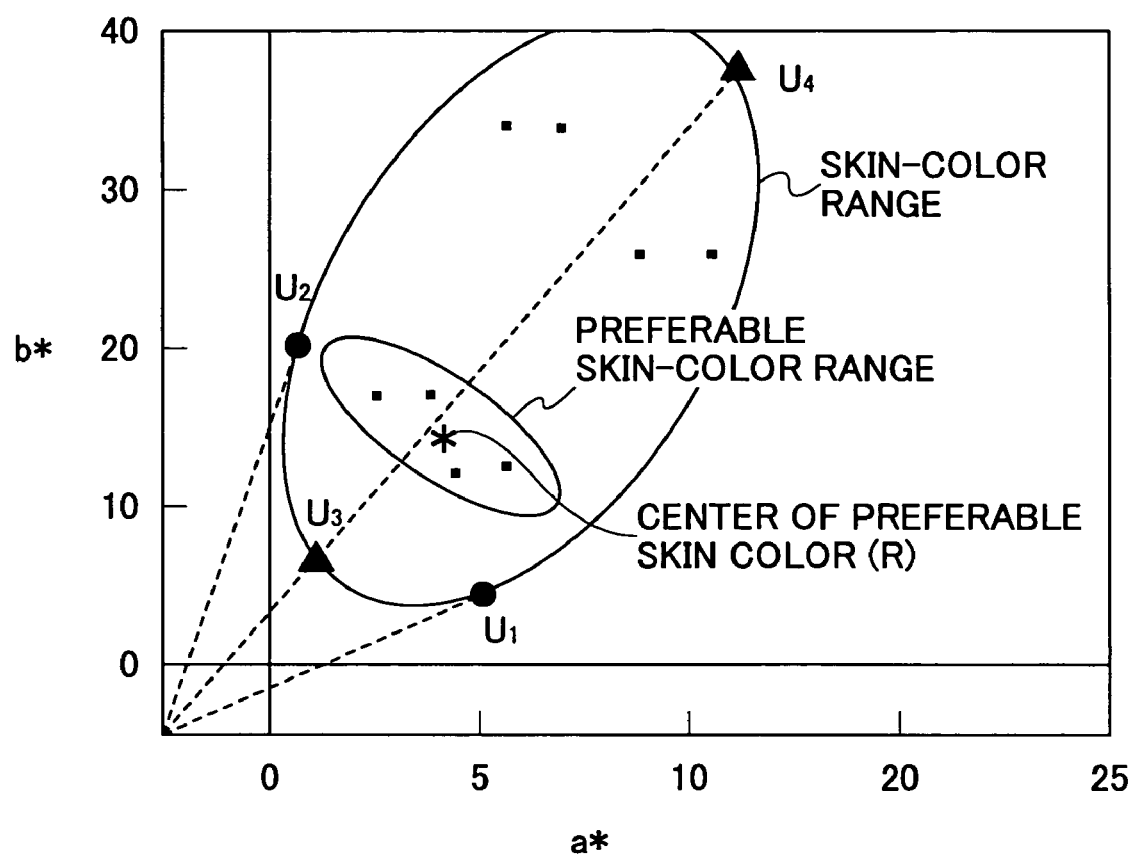
FIG. 3 is a diagram for illustrating the color information of a memory (skin) color and the setting of a preferable skin color according to the first embodiment of the present invention.

In this embodiment, the range of a skin-colored area is calculated by calculating the tristimulus values (X, Y, Z) of the CIE 1931 standard colorimetric system (CIEXYZ 1931) and the CIELAB values. FIG. 3 is a diagram showing a skin-color range. An ellipsoid including 90% of the Lab values of the obtained points may be defined, and the range of the ellipsoid may be defined as a skin-color range.

Letting the coordinates of the intersections $U_1$ and $U_2$ of the periphery of the above-described skin-color range and the line segments connecting the periphery and the origin be ($L^*(U_1)$, $a^*(U_1)$, $b^*(U_1)$) and ($L^*(U_2)$, $a^*(U_2)$, $b^*(U_2)$), respectively, and letting the coordinates of the intersections $U_3$ and $U_4$ of the periphery of the above-described skin-color range and the line segments connecting the center of the ellipsoid and the origin be ($L^*(U_3)$, $a^*(U_3)$, $b^*(U_3)$) and ($L^*(U_4)$, $a^*(U_4)$, $b^*(U_4)$), respectively, it is possible to set the maximum and minimum hue and chroma values of the four points as the skin-color range.

Further, at the time of the conversion into values in an appropriate equivalent color space, it is required to set an environment for color observation. For instance, in Equation (1), the color observation environment is limited to an observation environment at a light source. Therefore, a skin-colored area in another observation environment cannot be defined.

However, a user observes image data in a variety of environments. Therefore, it is desirable to convert the CIEXYZ 1931 tristimulus values calculated from Equation (1) by applying, for instance, a color appearance model such as the von Kries model or CIECAM in accordance with color appearances by various light sources (under various lighting conditions). It is necessary to specify observation environment parameters to perform the conversion. It is suitable that characteristic values are preset for the parameters, and are changed when the user specifies the values of the parameters.

Method of Setting a Preferable Skin Color:

Next, a description is given of a method of setting the color information of a preferable skin color.

First, a plurality of image data items each containing a skin color are collected, and one or more of the image data items are subjectively selected through subjective close examination. Then, subjective evaluation as to whether the selected image data is "preferable" or "not preferable" is performed.

The chromaticity coordinates of the skin color of image data determined as having a high subjective evaluation point are employed. The principal components of the employed chromaticity coordinates are analyzed using Equation (4) so as to calculate the first, second, and third principal component vectors and their respective eigen values.

$$\begin{bmatrix} P_1 \\ P_2 \\ P_3 \end{bmatrix} = \begin{bmatrix} p_{11} & p_{12} & p_{13} \\ p_{21} & p_{22} & p_{23} \\ p_{31} & p_{32} & p_{33} \end{bmatrix} \begin{bmatrix} L^* \\ a^* \\ b^* \end{bmatrix} \quad (4)$$

$$\left(\frac{P_1}{\sqrt{\lambda_1}}\right)^2 + \left(\frac{P_2}{\sqrt{\lambda_2}}\right)^2 + \left(\frac{P_3}{\sqrt{\lambda_3}}\right)^2 = 1$$

where $P_1$, $P_2$, and $P_3$ are the first, second, and third components, respectively, $\lambda_1$, $\lambda_2$, and $\lambda_3$ are the eigen values of the first, second, and third components, respectively, and $p_{11}$ through $p_{33}$ are constants.

Letting the center of the calculated ellipsoid be the center coordinates R of a preferable skin color, and setting the square roots of the eigen values of the respective principal components as tolerance, a preferable skin-color range as shown in FIG. 3 is set.

A memory color and preferable color information therefor that are set as described above are prestored in the storage part 109. When the listed objects of memory colors in pages 7-18 of "Study of Phenomenal Characteristics of Memory Colors (First Report)" by Kazuyuki Natori and Gentaro Omi, Color Study, the Color Science Association of Japan, 2000, are employed as memory colors, for instance, the same processing is applicable.

Further, chromaticity is not limited to that of the Lab color space. The chromaticity of the YCC color space, xy chromaticity, and chromaticity using an RGB ratio are also employable.

The specific color subjected to correction in the color correction unit 100 may be specified by a user as follows.

First, a selection button for color specification is selected from a menu displayed on the screen of an image display unit (not graphically represented). Next, a message asking which memory color to employ as a specific color is successively displayed on the screen with four selection buttons of Memory Color 1, Memory Color 2, User Specification 1, and User Specification 2 being displayed below the message. The user can select one of the four selection buttons.

By selecting a desired memory color from the four selection buttons, the memory color corresponding to the selected button is read out from the storage part 109 as the specific color.

Predetermined memory colors such as a human skin color and the color of sky may be correlated with Memory Color 1 and Memory Color 2, respectively, and memory colors previously specified by the user may be correlated with User Specification 1 and User Specification 2. For instance, the color of water and the color of grass and trees may be correlated with User Specification 1 and User Specification 2, respectively. Thus, the user can set specific colors in memory colors based on the original image data.

In the following description, the specific color selected by the user is the memory color of a human skin color. However, the present invention is also applicable in the case of other memory colors. Further, the area formed of the specific color in the original image data is referred to as a specific color area. When the memory color of a human skin color is selected as the specific color, the specific color area is also referred to as a skin-colored area.

The image data output part 30 outputs the image data subjected to color correction in the color correction unit 100 to a printer, a multi-function apparatus, a facsimile machine, or a storage device such as a hard disk unit or an optical recording medium recorder. The image data output part 30 may output the corrected image data to outside via a network.

Next, an expatiation is given of each of the components of the color correction unit 100.

Characteristic Value Calculation Part 103:

The characteristic value calculation part 103 calculates the characteristic values of the image data supplied from the image data input part 10, and outputs a characteristic value table.

First, the R, G, and B data (R, G, B) of each pixel of the original image data input from the image data input part 10 is converted into chromaticity coordinates (L*, a*, b*) in the CIELAB uniform color space by:

$$\begin{bmatrix} L^* \\ a^* \\ b^* \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R \\ G \\ B \end{bmatrix} \quad (5)$$

where $a_{11}$ through $a_{33}$ are conversion factors formed of constants.

Next, a description is given of a method of calculating the characteristic values of the original image data from the obtained chromaticity coordinates.

The original image data is split into areas (regions) in accordance with its image characteristics, and the characteristic values are calculated area by area. As the method of splitting the original image data into areas, a variety of methods is applicable, such as a method of splitting image data into areas recursively from the statistical information of the image data ("Structured Description of Color-Image Data Region Splitting" by Yu-ichi Ota, Takeo Kanade, and Toshiyuki Sakai, Information Processing, Information Processing Society of Japan, December 1978, Vol. 19, No. 12, pp. 1130-1136) or a splitting method using the statistical information of an image ("Picture Segmentation Using A Recursive Segmentation Splitting Method" by Ron Ohlander et al., Comp. Graph. and Image Proc., pp. 313-333).

Figure 4A:
FIGS. 4A and 4B are diagrams for illustrating the splitting of the original image data into areas according to the first embodiment of the present invention.
Figure 4B:
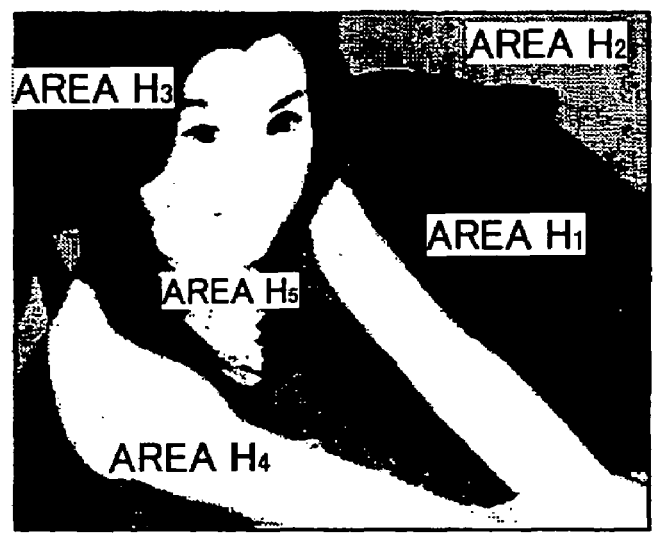

In this embodiment, a splitting method to which the K-means algorithm is applied is employed. For instance, image data as shown in FIG. 4A is split into areas so that an image as shown in FIG. 4B is obtained. The image of FIG.

4B is subjected to contrast correction to be represented by shading information so as to make it easy to understand the results of the area splitting.

The details of this splitting method are described in the above-mentioned documents. The outline is as follows.

First, the entire screen of the original image data is split into preset sub-areas (regions) so that initial areas are generated. Then, a statistical information table is calculated (created) for each initial area. In this embodiment, the original image data is split into 25 (vertically five times horizontally five) areas (5×5=25). However, only five of the 25 sub-areas are shown in FIG. 4B for convenience of description.

At this point, each statistical information table is composed of the arithmetic average ($L^*_{ave}$, $a^*_{ave}$, $b^*_{ave}$) of the color information Lab values (L*, a*, b*) of the corresponding initial area and the arithmetic average ($I_{ave}$, $J_{ave}$) of the position information (i, j) of the corresponding initial area. The arithmetic average ($L^*_{ave}$, $a^*_{ave}$, $b^*_{ave}$) and the arithmetic average ($I_{ave}$, $J_{ave}$) are calculated from:

$$L^*_{ave} = \frac{\sum_{t=1}^{v}\sum_{u=1}^{w} L^*_{tu}}{v \times w}, \; a^*_{ave} = \frac{\sum_{t=1}^{v}\sum_{u=1}^{w} a^*_{tu}}{v \times w}, \; b^*_{ave} = \frac{\sum_{t=1}^{v}\sum_{u=1}^{w} b^*_{tu}}{v \times w} \quad (6)$$

$$I_{ave} = \frac{\sum_{t=1}^{v}\sum_{u=1}^{w} I_{tu}}{v \times w}, \; J_{ave} = \frac{\sum_{t=1}^{v}\sum_{u=1}^{w} J_{tu}}{v \times w}$$

where v and w are the number of vertical and horizontal pixels [pix] of the initial area, respectively, $L^*_{tu}$, $a^*_{tu}$, and $b^*_{tu}$ are Lab values at a pixel position [t, u], and $I_{tu}$ and $J_{tu}$ are position information at a pixel position [t, u].

Next, the relative distance D(h) between the chromaticity coordinate values (L*, a*, b*) and the position information (i, j) of the image data and each statistical information table is calculated by a sub-area search using Equation (7) so as to determine in which of the 25 sub-areas the relative distance D(h) is minimized.

$$D(No) = \sqrt{Q_1\{(L^*-L^*_{ave})^2+(a^*-a^*_{ave})^2+(b^*-b^*_{ave})^2\}+Q_2\{(i-I_{ave})^2+(j-J_{ave})^2\}} \quad (7)$$

where $Q_1$ and $Q_2$ are constants, which are 1 ($Q_1=Q_2=1$) in this embodiment.

This sub-area search is repeated as many times as the number of sub-areas (25 times in this embodiment) to search for the number h of the sub-area that minimizes D(h). This h represents sequential serial numbers for the sub-areas, and corresponds to the subscript h of $H_h$ in the table of FIG. 5.

The contents of the statistical information table of the searched-out sub-area and the number of the sub-area to which the pixel (i, j) originally belongs are rewritten, thereby rewriting the statistical information tables of the sub-area to which the pixel (i, j) originally belongs and the searched-out sub-area. This operation is repeated as many times as the number of pixels of the image data. In this embodiment, this operation is repeated (i+1)×(j+1) times.

After repeating the above-described processing a predetermined number of times, the image data split into areas as shown in FIG. 4B is obtained.

Finally, the characteristic value table of the original image data is created based on the information on the sub-areas obtained in their respective statistic information tables, employing the central value ($L^*_{ave}$, $a^*_{ave}$, $b^*_{ave}$) of the chromaticity coordinates of the original image data and the percentage $\Delta S$ [%] of an area occupied by a sub-area in the area of the original image data of each sub-area as the characteristic values of the original image data.

In this embodiment, the average ($L^*_{ave}$, $a^*_{ave}$, $b^*_{ave}$) is employed as characteristic values of the original image data (image data before correction). However, a variety of statistics similar to the average, such as a standard deviation, a median, and a mode, are also employable.

Figures 5, 6:
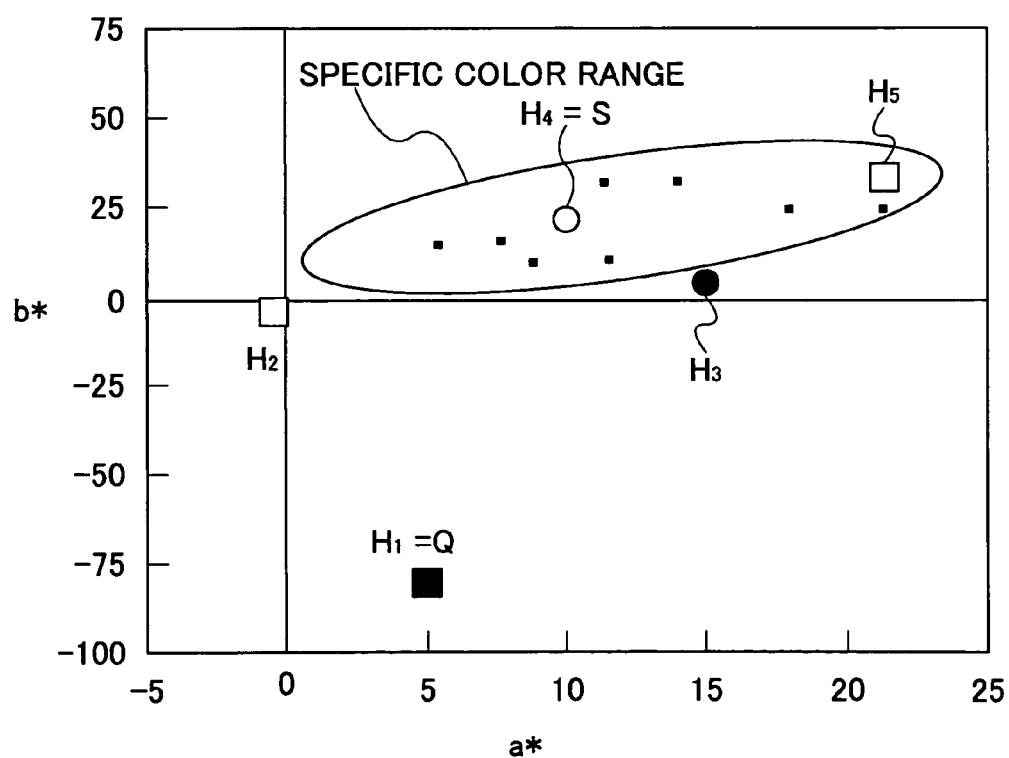
FIG. 5 is a diagram showing a characteristic data table according to the first embodiment of the present invention.
FIG. 6 is a diagram showing the results of the mapping of chromaticity coordinates in each area of FIG. 4B into the CIELAB uniform color space according to the first embodiment of the present invention.

As a result of the above-described processing, the characteristic value table is obtained from the original image data as shown in FIG. 5.

Area Extraction Part 105:

The area extraction part 105 extracts the specific color area (skin-colored area) and its peripheral background area of the original image data supplied from the image data input part 10 from the calculated characteristic value table and the color information of a memory color prestored in the storage part 109.

In order to perform the extraction, the R, G, and B original image data (R, G, B) is subjected to the conversion of Equation (5) sub-area by sub-area as in the characteristic value calculation part 103 so as to be mapped into the CIELAB uniform color space.

A plurality of points onto which the original image data is mapped are defined as $H_h$ ($L^*(H_h)$, $a^*(H_h)$, $b^*(H_h)$), where h is the number of sub-areas (h=1, ... ). Of the points, those belonging to a range in the chromaticity coordinates of the specific color (skin color) which range is preset in the storage part 109 are determined to be the specific color area (skin-colored area).

Next, a description is given, with reference to FIG. 6, of a method of extracting the specific color area (skin-colored area).

FIG. 6 is a diagram showing the results of the mapping of chromaticity coordinates in each split area (sub-area) of the original image data of FIGS. 4A and 4B into the CIELAB uniform color space. A range denoted as a "specific color range" in FIG. 6 indicates the range of the chromaticity coordinates of the specific color (skin color) stored in the storage part 109. The points of the original image data mapped within this range correspond to the specific color.

Points $H_h$ in FIG. 6 correspond to the numbers h of the sub-areas of the original image data. Points $H_4$ and $H_5$ are the chromaticity coordinates of the image data to be extracted as the specific color area (skin-colored area).

The specific color area (skin-colored area) extracted at this point includes the two points $H_4$ and $H_5$. In this case, a point (or an area) having the higher (highest) percentage $\Delta S$ [%] is determined to be the specific color area (skin-colored area). Accordingly, Point $H_4$ is determined as the specific color area (skin-colored area).

The area having the highest percentage $\Delta S$ [%] is determined based on the percentages $\Delta S$ [%] of the split areas (sub-areas) entered in the previously created characteristic value table.

Likewise, of the three areas $H_1$, $H_2$, and $H_3$ other than the specific color area (skin-colored area), the area $H_1$ having the highest percentage $\Delta S$ [%] is selected as the background area of the specific color area.

Further, in the case of extracting the specific color area and its background area, if the specific color area or the background area is smaller than a predetermined area size, it may be determined that the specific color area or the background area is not to be employed for correction. As a result, an appropriate area may be extracted. A percentage $\Delta S$ for the predetermined area size is suitably less than or equal to 5 to 10%.

Figure 7:
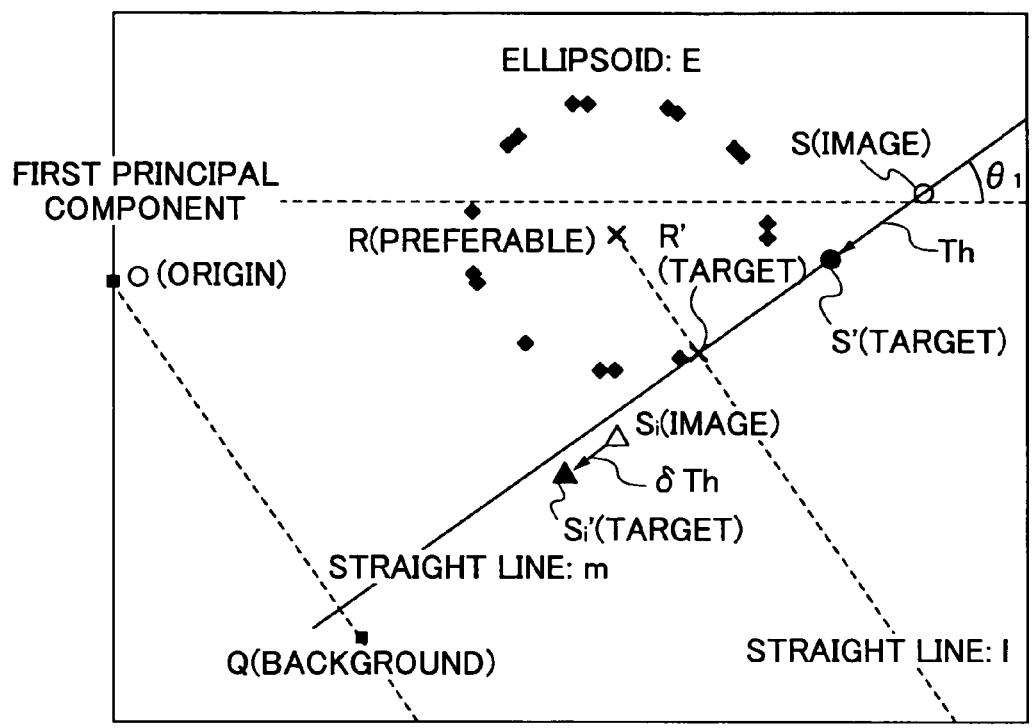
FIG. 7 is a diagram for illustrating a method of calculating a correction according to the first embodiment of the present invention.

Target Value Calculation Part 107:

The target value calculation part 107 calculates the target value of a preferable color which serves as a target of correction for the specific color area (skin-colored area) of the original image data. A description is given, with reference to FIG. 7, of a method of calculating the target value. Referring to FIG. 7, R indicates the chromaticity coordinates of the center of a preferable specific color area (preferable skin-colored area), and S indicates the characteristic values of the specific color area (skin-colored area) of the original image data. The above-described Point $H_4$ corresponds to Point S. The chromaticity coordinates R' of the specific color (skin color) that serve as the target value are calculated from Point Q of the background area (corresponding to the above-described Point $H_1$) and Point R.

In the following, the target value is calculated by solving the equations of straight lines connecting the points on chromaticity coordinates using two-dimensional space coordinates. However, the method of calculating the target value is not limited to this method. For instance, three-dimensional principal components are applicable as below-described three-dimensional components. Further, it is possible to calculate the equation of a straight line using vector components.

First, letting the coordinates of Point O (origin) and Point Q (background) be O($a^*(o)$, $b^*(o)$) and Q($a^*(q)$, $b^*(q)$), respectively, a straight line l that has the same slope as a segment passing through Points O and Q and passes through Point R (preferable) is expressed by:

$$l: b^* = \frac{b^*(q) - b^*(o)}{a^*(q) - a^*(o)} \cdot \{a^* - a^*(r)\} + b^*(r) \tag{8}$$

At this point, the coordinates of Point R are R($a^*(r)$, $b^*(r)$), and the intersection of the straight line l and an ellipsoid E formed of the first and second principal components of the preferable specific color area (preferable skin-colored area) is calculated as R' (target). The obtained coordinates are defined as R'($a^*(r')$, $b^*(r')$). The ellipsoid E is defined by:

$$E: \left(\frac{P_1}{\sqrt{\lambda_1}}\right)^2 + \left(\frac{P_2}{\sqrt{\lambda_2}}\right)^2 = 1 \tag{9}$$

$$\begin{bmatrix} P_1 \\ P_2 \end{bmatrix} = \begin{bmatrix} p_{11} & p_{12} \\ p_{21} & p_{22} \end{bmatrix} \begin{bmatrix} a^* \\ b^* \end{bmatrix} \tag{10}$$

where $P_1$ and $P_2$ are the first and second principal components, respectively, $\lambda_1$ and $\lambda_2$ are the eigen values of the first and second principal components, respectively, and $p_{11}$ through $p_{22}$ are constants.

A straight line m connecting Point S($a^*(s)$, $b^*(s)$) of the characteristic values of the original image data and the target value R' is calculated from:

$$m: b^* = \frac{b^*(r') - b^*(s)}{a^*(r') - a^*(s)} \cdot \{a^* - a^*(s)\} + b^*(s) \tag{11}$$

and the control point S' (target) of the image data is set at a predetermined point on the straight line m.

At this point, a correction Th from Point S to Point S' is calculated from the characteristic values of the image, which is described below with reference to the image data correction part 111.

Image Data Correction Part 111:

The image data correction part 111 calculates the correction Th in accordance with the target value of the preferable color for the specific color calculated in the target value calculation part 107 and the characteristic values obtained from the characteristic value table of the original image data. Then, the image data correction part 111 obtains the corrected image data by performing color correction on the original image data by the correction Th.

A correction according to the percentage $\Delta S$ [%] of the specific color area (skin-colored area) in the original image data is stored in a memory such as an LUT (look-up table) as the correction Th.

Alternatively, a function such as Equation (12) may be defined so as to suitably calculate the correction Th using the percentage $\Delta S$ obtained from the characteristic value table.

$$Th = \begin{cases} a(1-r) \cdot (\Delta S_s)^r & \ldots\ 0 \leq \Delta S_s \leq a \\ 1 - (1-a)^{1-r} \cdot (1 - \Delta S_s)^r & \ldots\ a \leq \Delta S_s \leq 1 \end{cases} \quad (12)$$

where $\Delta S_s$ is the percentage $\Delta S$ of the specific color (skin color), and a and r are constants of 0 to 1.

Next, a description is given, with reference to FIG. 7, of a method of performing correction on the entire image.

The original image data is converted from the Lab values to the values $P_1$ and $P_2$ by Equation (10).

Then, a point $S_i$ of the original image data is corrected to a point $S_i'$ in accordance with the distance from the background area. A correction $\delta Th$ for this correction is expressed by Equation (13), letting the distance between Point Q of the background area and Point S of the image be |QS| and the distance between Point S and Point S' be Th.

$$\delta Th = \sqrt{(P_1 \delta Th)^2 + (P_2 \delta Th)^2} \quad (13)$$

$$P_1 \delta Th = Th \cdot \cos\theta_1 \cdot \frac{|\overline{OS_i}|}{|\overline{QS}|}$$

$$P_2 \delta Th = Th \cdot \cos\theta_2 \cdot \frac{|\overline{OS_i}|}{|\overline{QS}|}$$

where $\theta_1$ and $\theta_2$ are angles that the first and second principal components, respectively, form with respect to the straight line m, and |QS| is the distance between Points Q and S.

Figure 8:
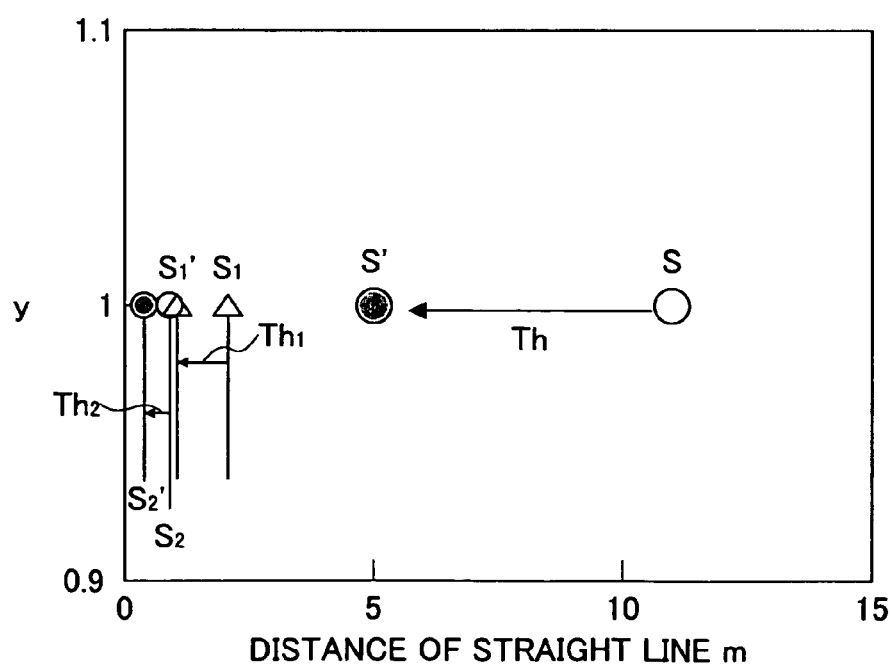
FIG. 8 is a diagram for illustrating the relationship between the correction and the distance between a specific color area to be subjected to correction and its background area according to the first embodiment of the present invention.

A description is given, with reference to FIG. 8, of the detailed movement of this correction. FIG. 8 shows positions of color correction before and after the correction. As described above, Point S (image) close to the specific color area (skin-colored area) is corrected to Point S' (target). In the drawing, an arrow indicates the magnitude (amount) of correction. Likewise, a point $S_1$ is moved by a correction $Th_1$ (composed of $P_1 \delta Th_1$ and $P_2 \delta Th_1$) and corrected to a point $S_1'$. Further, a point $S_2$, which is close to the background area, is moved by a correction $Th_2$ (composed of $P_1 \delta Th_2$ and $P_2 \delta Th_2$) and corrected to a point $S_2'$.

The comparison of these corrections show that as a point moves away from the specific color area (skin-colored area) and comes closer to the background area as $S \rightarrow S_1 \rightarrow S_2$, a correction for the point decreases as $|Th|>|Th_1|>|Th_2|$.

By this correction, the specific color area (skin-colored area) of the image is corrected to a preferable color while the color of the background area is scarcely corrected. Accordingly, only the specific color (skin color) may be suitably corrected without losing the balance of the entire image.

Finally, P1 and P2 are inversely converted into Lab values, and are further inversely converted into R, G, and B values by:

$$\begin{bmatrix} a^* \\ b^* \end{bmatrix} = \begin{bmatrix} p_{11} & p_{12} \\ p_{21} & p_{22} \end{bmatrix}^{-1} \begin{bmatrix} P_1 \\ P_2 \end{bmatrix} \quad (14)$$

$$\begin{bmatrix} R \\ G \\ B \end{bmatrix} = \begin{bmatrix} a_{11} & a_{12} & a_{13} \\ a_{21} & a_{22} & a_{23} \\ a_{31} & a_{32} & a_{33} \end{bmatrix}^{-1} \begin{bmatrix} L^* \\ a^* \\ b^* \end{bmatrix}$$

As a result, the corrected image data is obtained, and is supplied to the image data output part 30.

According to this embodiment, a linear primary expression that inversely converts Lab values into R, G, and B values is employed. However, it is also possible to store this in an LUT and coverts Lab values into R, G, and B values by an interpolation operation. Alternatively, an LUT that converts Lab values into density is also employable.

The same processing as described above is performable in the case of correcting another memory color. In this case, the a-b plane may be split into appropriate hues (areas), and the correction of the memory color may be controlled in each area to which the memory color belongs.

Second Embodiment

According to a second embodiment, a correction obtained in the same way as in the first embodiment is subjected to image processing so that a preferable color is always obtained in accordance with the attribute information of the original image data obtained from outside.

FIG. 9 is a block diagram showing a functional configuration of the image processing apparatus according to the second embodiment of the present invention. Referring to FIG. 9, image data is input from the image data input part 10, subjected to color correction in the color correction unit 100, and output from the image data output part 30.

The color correction unit 100 includes the unit controller 101, the characteristic value calculation part 103, the area extraction part 105, the target value calculation part 107, the storage part 109, an attribute information obtaining part 112, and the image data correction part 111.

The unit controller 101 controls the entire color correction unit 100. The characteristic value calculation part 103 calculates the characteristic values of the image data input from the image input part 10, which is hereinafter also referred to as the original image data, and outputs the characteristic value table of the original image data. The area extraction part 105 extracts a specific color area to be subjected to color correction and its background area included in the original image data, referring to the color information of a memory color stored in the storage part 109. The target value calculation part 107 calculates the target value of a preferable color after color correction for the specific color from the color information of the extracted specific color area and background area and preferable color information for the specific color obtained from the storage part 109. The attribute information obtaining part 112 obtains the attribute information of the original image data. The image data correction part 111 calculates a correction (amount) in accordance with the calculated target value of the preferable memory color and characteristic values obtained from the characteristic value table and the attribute information of the original image data. Then, the image data correction part 111 obtains image data by performing color correction on the original image data by the calculated amount. The obtained image data is hereinafter also referred to as corrected image data.

In FIG. 9, the elements having the same functions as in the first embodiment (FIG. 2) are referred to by the same numerals, and with respect to those elements, only a difference from the first embodiment is described.

The attribute information obtaining part 112 reads out information added to the original image data supplied from the image data input part 10, and supplies the read-out information to the image data correction part 111. Any file structure such as the Exif or DPOF format structure is employable as the data format of the read-out information.

For instance, the attribute information obtaining part 112 obtains the attribute information of the original image data, which is formed of a file structure based on the Exif format as shown in FIG. 10. Referring to FIG. 10, in the case of obtaining image attribute information on the shot scene type of the information on picture-taking conditions of the original image data, each integer value of the type (unsigned integer value) of the scene capture type in 41990 of the tag number (HEX: hexadecimal) of the image is read. For instance, if the type of the scene capture type is 0, it is shown that the taking of a picture has been performed under standard picture-taking conditions. If the type of the scene capture type is 2, it is shown that a portrait (human image) has been captured.

When the image attribute information attached to the original image data has been read, the image data correction part 111 obtains a correction factor $\alpha_{scene}$ according to the image attribute information from a correction factor table (LUT). Then, the image data correction part 111 multiplies a correction calculated in the same manner as in the first embodiment by the correction factor $\alpha_{scene}$, and corrects the original image data using the multiplied correction as the final correction.

When the image attribute information is the scene capture type, the correction factor table has a data structure such that the types of the scene capture type are correlated with their respective correction factors $\alpha_{scene}$ as shown in FIG. 11.

For instance, when a portrait is captured (this case corresponds to Type 2 of FIG. 11), the correction factor $\alpha_{scene}$ is 1.30. This value is higher than that for STANDARD (corresponding to Type 0 of FIG. 11). This is because when a portrait is captured, a correction is increased since emphasis is put on the reproducibility of a skin-colored area in the image data.

A method of calculating the correction is not limited to the above-described method that refers to the correction factor table. For instance, the correction factor $\alpha_{scene}$ may be suitably calculated by:

$$\alpha = \begin{cases} \alpha_{scene} \cdot \{(1-r) \cdot (\Delta S_{skin})^r\} & \ldots 0 \leq \Delta S_{skin} \leq a \\ \alpha_{scene} \cdot \{1 - (1-a)^{1-r} \cdot (1-\Delta S_{skin})^r\} & \ldots a \leq \Delta S_{skin} \leq 1 \end{cases} \quad (15)$$

where $\Delta S_{skin}$ is the percentage $\Delta S$ of the specific color (skin color), and a and r are constants of 0 to 1.

Further, the image attribute information is not limited to the scene capture type. Correction may be performed based on other image attribute information. For instance, in the above-described correction factor table or Equation (15), the correction factor $\alpha_{scene}$ may be set so that $\alpha_{scene}=1$ when a flash is used and detected and $\alpha_{scene}\approx 0$ in the other cases. As a result, correction to set off a man in a night scene mode may be controlled.

Further, the image data of the skin-colored area may be reproduced more preferably by increasing the correction factor $\alpha_{scene}$ if, of the image attribute information, the F number is great or the shutter speed is low.

Further, it is also possible to perform correction in accordance with the magnitude of white balance correction. The R, G, and B values of the skin-colored area have their respective averages compared with those of the entire image. The differences are set in an LUT so that correction is performed based on the set differences.

That is, even when the image of a man is captured with considerably poor white balance, the skin color of the man is set within a preferable range. Accordingly, the image data of the skin-colored area can be reproduced more preferably.

According to the configuration of the second embodiment, a specific one of memory colors (the specific color or the human skin color) desired by a user may be corrected in accordance with its peripheral area so that a preferable color is always obtained.

Figure 12:
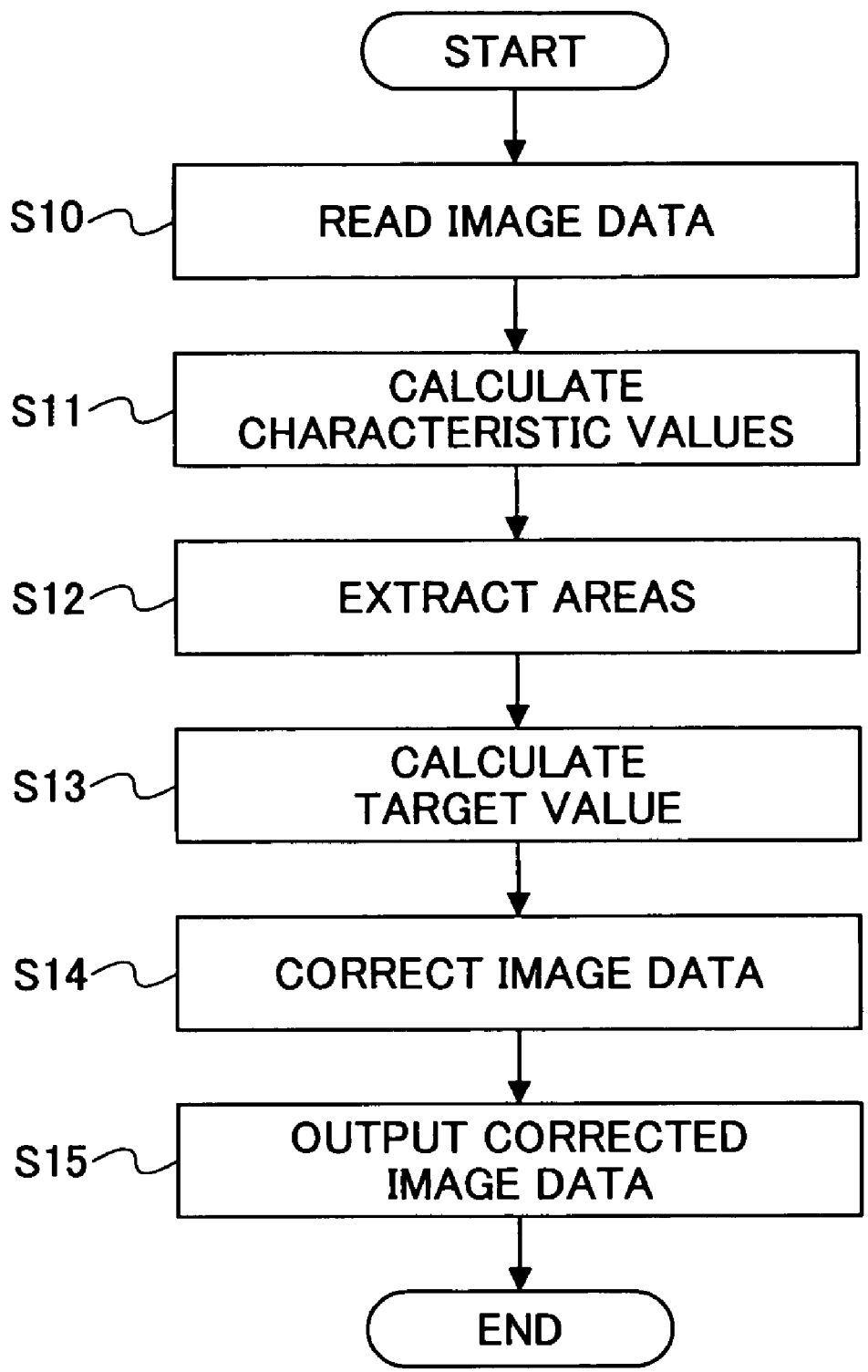
FIG. 12 is a flowchart showing a procedure for correction in the image processing apparatus according to the first and second embodiments of the present invention.

Next, a description is given, with reference to FIG. 12, of a procedure for correcting the original image data in the image processing apparatus according to the first and second embodiments.

First, in step S10 of FIG. 12, image data is input from outside via a network or from an apparatus such as a hardware disk drive, a flexible disk drive, an optical recording medium reader, a scanner, or a digital camera. When the input image data is an analog signal, the image data is converted into a digital signal. Thereafter, the image data is subjected to predetermined digital processing, and is output as digital signals of R (red), G (green), and B (blue).

Next, in step S11, the R, G, and B data (R, G, B) of each input pixel is converted into chromaticity coordinates (L*, a*, b*) in the CIELAB uniform color space by Equation (5). Using the obtained chromaticity coordinates, the original image data is split into sub-areas recursively from its statistical information. Then, the central value (L*$_{ave}$, a*$_{ave}$, b*$_{ave}$) of the chromaticity coordinates of the original image data and the percentage $\Delta S$ [%] of an area occupied by a sub-area in the area of the original image data are calculated as characteristic values for each sub-area, and are stored in the characteristic value table.

In step S12, the original image data (R, G, B) is subjected to the conversion of Equation (5) sub-area by sub-area to be mapped into the CIELAB uniform color space. Of the mapped points $H_h$, those belonging to a range in the chromaticity coordinates of the specific color (skin color) which range is stored in the storage part 109 are determined to be the specific color area (skin-colored area). The background area of the specific color area is selected from the rest of the mapped points.

If the percentage ΔS [%] of a sub-area entered in the characteristic value table is smaller than a predetermined area size (a percentage ΔS [%] less than or equal to 5 to 10%), the sub-area is not to be selected as the specific color area (skin-colored area) or the background area.

Then, in step S13, the target value of a preferable color serving as a target of correction for the specific color area (skin-colored area) of the original image data is calculated.

Referring to FIG. 7, first, the straight line 1 that has the same slope as the segment passing through Points O (origin) and Q (background) and passes through Point R (preferable) is obtained (Equation (8)), and the intersection of the straight line 1 and the ellipsoid E (Equations (9) and (10)) formed of the first and second principal components of the preferable specific color area (preferable skin-colored area) is calculated as R' (target).

Next, the straight line m connecting Point S of the characteristic values of the original image data and the target value R' is calculated from Equation (11), and the control point S' (target) of the image data is set at a predetermined point on the straight line m.

The correction Th from Point S to Point S' is calculated in accordance with the percentage ΔS of the specific color area (skin-colored area) using an LUT or a function such as Equation (12).

In step S14, a correction by which the original image data is corrected is calculated based on the calculated target value of the preferable color and the characteristic values for the specific color area (skin-colored area) obtained from the characteristic value table. The original image data is subjected to color correction by the calculated correction. Thus, the corrected image data is obtained.

Referring to FIG. 7, the original image data is converted from the Lab values to the values $P_1$ and $P_2$ by Equation (10). Then, letting the distance between Point Q of the background area and Point S of the image be |QS| and a correction at Point S be Th, the correction δTh for Point $S_i$ of the original image data is calculated from Equation (13). Point S is corrected to Point $S_i'$ using the correction δTh.

If the image attribute information added to the original image data has been obtained at this point, the correction factor $\alpha_{scene}$ according to the image attribute information is obtained from the correction factor table or calculated from Equation (15). The correction Th and the correction δTh are multiplied by the correction factor $\alpha_{scene}$ to be determined as the final corrections.

Finally, using Equation (14), the values $P_1$ and $P_2$ are inversely converted into Lab values, and are further inversely converted into R, G, and B values. Thus, the (inversely converted) corrected image data is obtained.

In step S15, the corrected image data obtained by performing color correction on the original image data is output to a printer, a multi-function apparatus, a facsimile machine, or a storage device such as a hard disk unit or an optical recording medium recorder. Alternatively, the corrected image data may be output to outside via a network.

Third Embodiment

Figure 13:
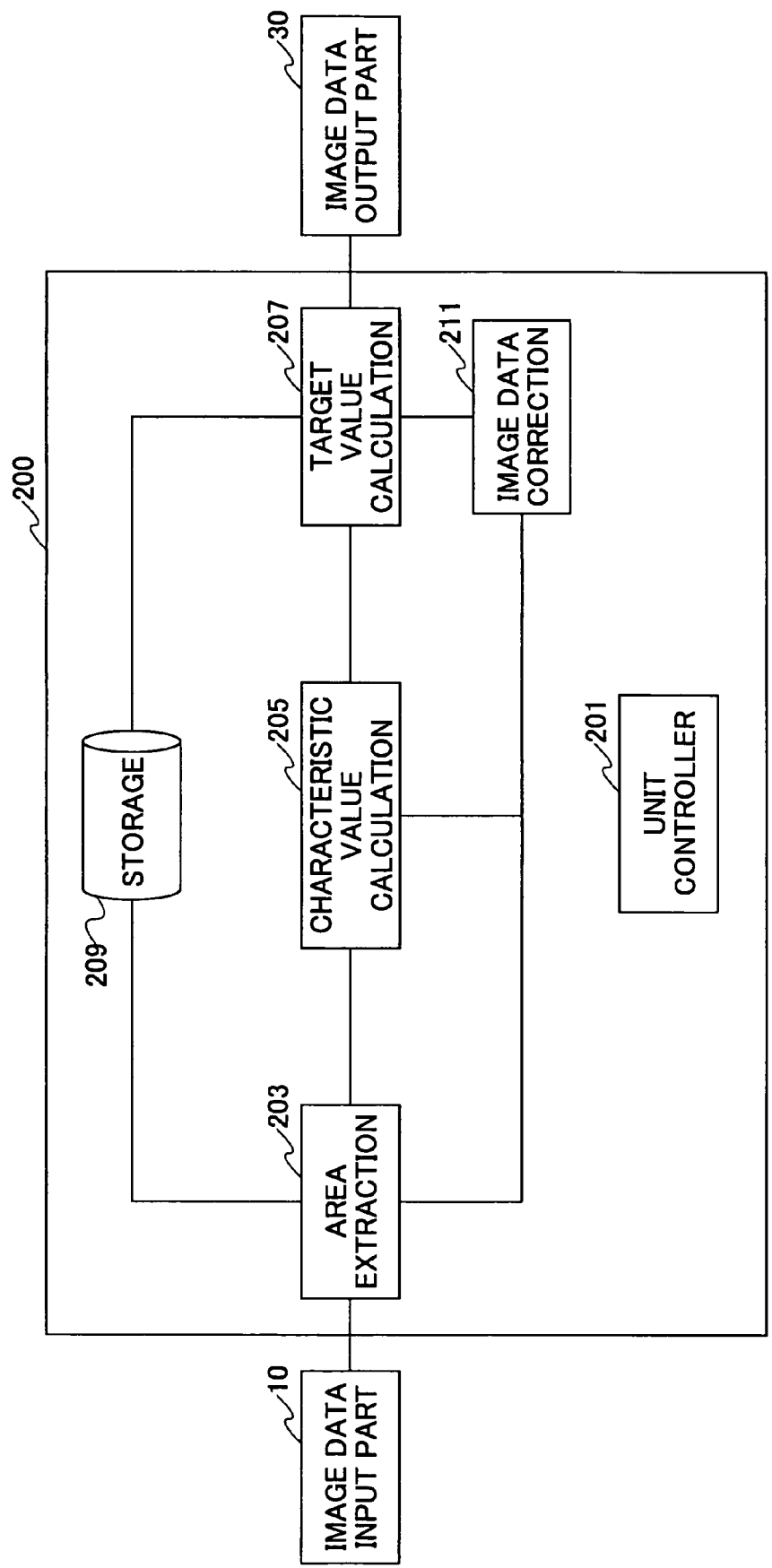
FIG. 13 is a block diagram showing a configuration of the image processing apparatus according to a third embodiment of the present invention.

Next, a description is given of a third embodiment of the present invention. FIG. 13 is a block diagram showing a configuration of the image processing apparatus according to the third embodiment of the present invention. Referring to FIG. 13, image data is input from the image data input part 10, subjected to color correction in a color correction unit 200, and output from the image data output part 30.

The color correction unit 200 includes a unit controller 201, an area extraction part 203, a characteristic value calculation part 205, a target value calculation part 207, a storage part 209, and an image data correction part 211.

The unit controller 201 controls the entire color correction unit 200. The area extraction part 203 extracts a specific color area to be subjected to color correction and its background area included in the image data input from the image input part 10, which is hereinafter also referred to as the original image data, referring to the range of a memory color stored in the storage part 209. The characteristic value calculation part 205 calculates the characteristic values of the extracted specific color area and background area. The target value calculation part 207 calculates the target value of the specific color area in accordance with the characteristic values obtained from the characteristic value calculation part 205 based on the characteristic values and the range of the memory color obtained from the storage part 209. The image data correction part 211 performs color correction on the specific color area extracted in the area extraction part 203 based on the calculated target value.

The image data input part 10 and the image data output part 30 have the same functions as in the first and second embodiment, and a description thereof is omitted.

The storage part 209 stores the chromaticity information of memory colors and the color information of a preferable color (preferable color information) for each memory color. The chromaticity information is stored as extraction conditions for extracting a specified memory color from the original image data. The memory colors are colors memorized by a man, such as the colors of skin, sky, ocean, river, grass and trees, and snow. In the below-described case, the range of chromaticity coordinates for extracting a memory color and the range of chromaticity coordinates of a preferable memory color are preset as the extraction conditions for extracting the memory color. Alternatively, it is also possible to preset only specific ranges of chromaticity coordinates.

Further, chromaticity is not limited to the below-described chromaticity according to the YCC color space. Xy chromaticity, and chromaticity using an RGB ratio are also employable.

The specific color subjected to correction may be specified by a user as described in the first embodiment. In the following description, the specific color is the memory color of a human skin color. However, the present invention is also applicable in the case of other memory colors.

Area Extraction Part 203:

First, the R, G, and B data (R, B, G) of each pixel input from the image data input part 10 is converted into YCC data (YY, $C_1$, $C_2$) by:

$$\begin{bmatrix} YY \\ C_1 \\ C_2 \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R \\ B \\ G \end{bmatrix} \quad (16)$$

where $a_{11}$ through $a_{33}$ are, for instance, constants as follows:

$$\begin{bmatrix} a_{11} & a_{12} & a_{13} \\ a_{21} & a_{22} & a_{23} \\ a_{31} & a_{32} & a_{33} \end{bmatrix} = \begin{bmatrix} 0.2989 & 0.5866 & 0.1145 \\ -0.1687 & -0.3312 & 0.5000 \\ 0.5000 & -0.4183 & -0.0816 \end{bmatrix}$$

Further, chroma (C) and hue angle (H) are calculated from the obtained $C_1$ and $C_2$ by:

$$C = \sqrt{C_1^2 + C_2^2}$$

$$H = \tan^{-1}(C_1/C_2) \quad (17)$$

Figure 14:
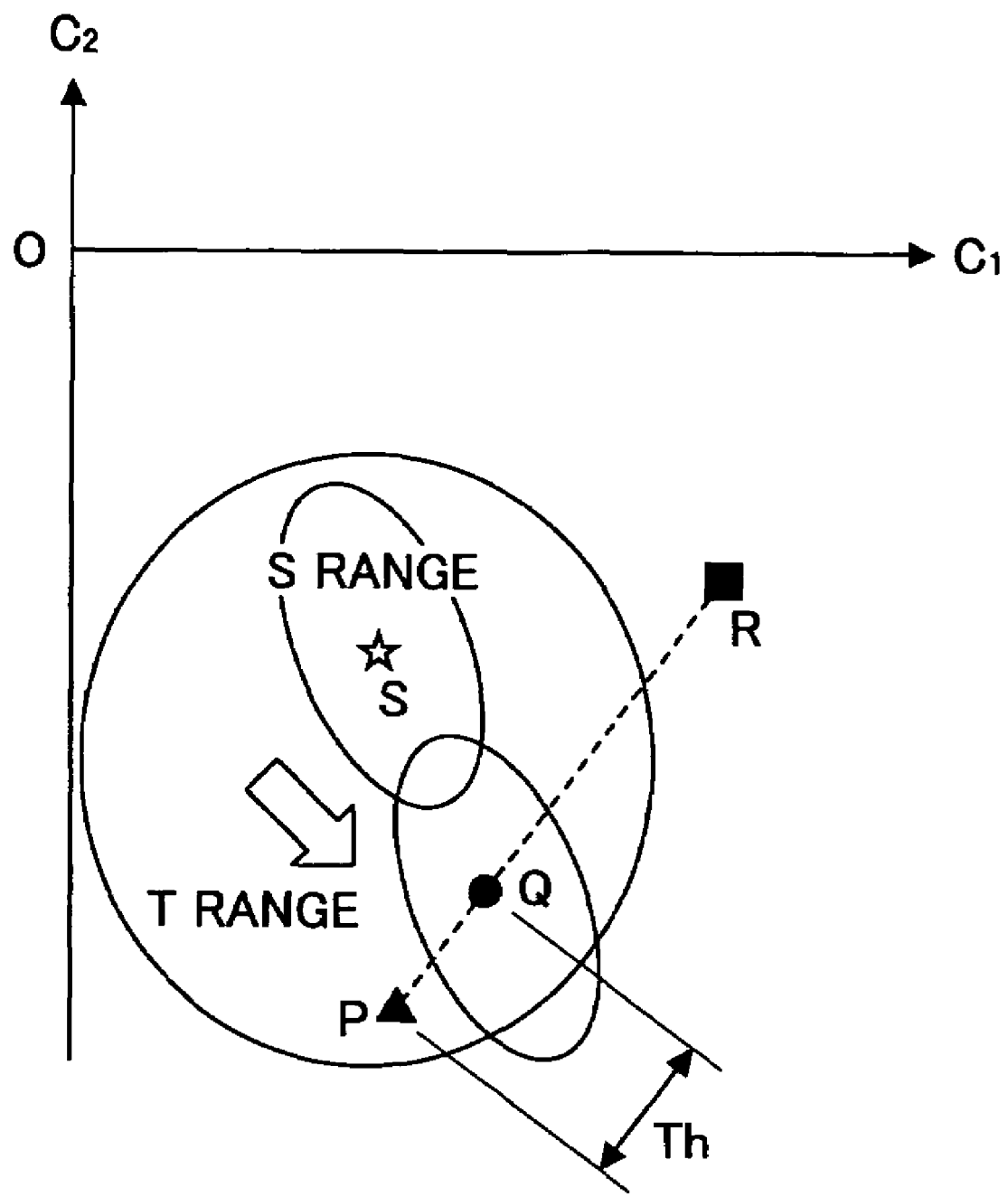
FIG. 14 is a diagram for illustrating the calculation of a characteristic value, a target value, and a correction according to the third embodiment of the present invention.

Next, a description is given, with reference to FIG. 14, of a method of extracting the specific color area (skin-colored area) existing in the image data from the obtained chromaticity information. FIG. 14 shows YCC color space coordinates in the $C_1$-$C_2$ plane. The distance and the angle from Point O in the space represent chroma (C) and hue angle (H), respectively. The data of each pixel of the original image data is converted from chromaticity coordinate values of the RGB color space into chromaticity coordinate values of the YCC color space by Equation (16).

Figure 15A:
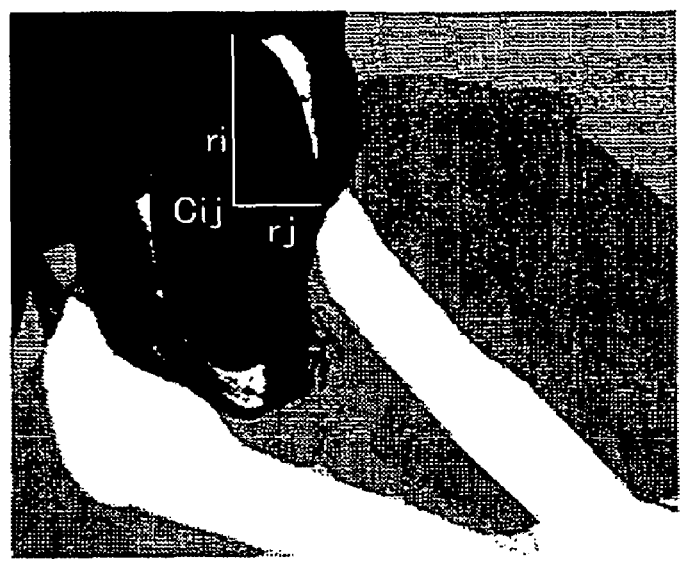
FIGS. 15A and 15B are diagrams for illustrating an extracted skin-colored area and background area according to the third embodiment of the present invention.

Next, the converted image data is compared with the range of the skin color (specific color) prestored in the storage part 209. The range of the skin-colored area may be specified by a user. That is, as shown in FIG. 15A, the center $C_{ij}$ of the image data is specified, and the quantities $r_i$ and $r_j$ along the vertical and horizontal axes, respectively, of an ellipsoid centered on Point $C_{ij}$ are specified. As a result, a substantial range of the skin-colored area can be determined.

The background area is defined as an area formed around the skin-colored area in an ellipsoid obtained by increasing the range (dimensions) of the skin-colored area by several times of the length of the short-axis.

Figure 15B:
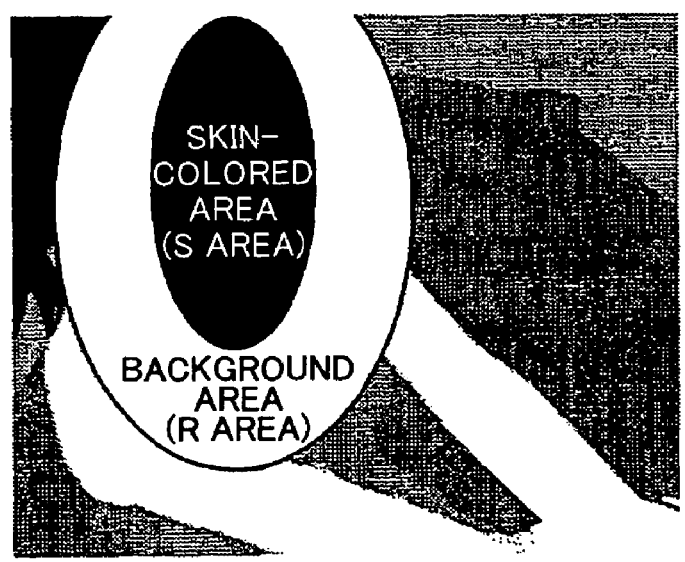

The range of the skin-colored area and the background area obtained by the above-described processing are shown as an S area and an R area, respectively, in FIG. 15B.

Characteristic Value Calculation Part 205:

The characteristic value calculation part 205 calculates the characteristic values of the skin-colored area and the background area extracted from the original image data. The characteristic values are calculated by the following two methods, for instance.

Figure 16:
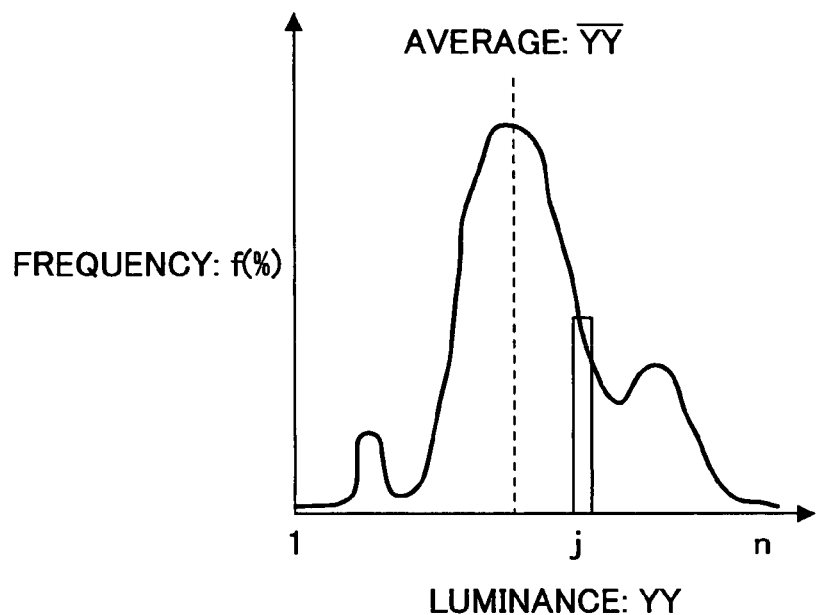
FIG. 16 is a schematic graph of a frequency distribution of luminance in a luminance plane according to the third embodiment of the present invention.

(a) A frequency distribution is calculated with respect to the mapped points of each of the YY, $C_1$, and $C_2$ planes into which each pixel point belonging to the skin-colored area of the original image data is mapped by YCC conversion. FIG. 16 is a schematic graph of the frequency distribution of the luminance YY plane. The horizontal axis represents luminance YY, and the vertical axis represents the frequency f (%) of luminance.

Then, a standard deviation ($\sigma$. Syy) in the luminance of the skin-colored area is calculated from a luminance (value) $YY_j$ at a luminance point j and the average of the luminance values (a luminance average). Likewise, a standard deviation in each of the $C_1$ and $C_2$ planes is calculated. The standard deviations are calculated by:

$$\sigma \cdot Syy = \sqrt{\sum_{j=1}^{n} (\overline{YY} - YY_j)^2 / (n-1)} \quad (18)$$

-continued $$\sigma \cdot Sc1 = \sqrt{\sum_{j=1}^{n} (\overline{C_1} - C_{1j})^2 / (n-1)}$$

$$\sigma \cdot Sc2 = \sqrt{\sum_{j=1}^{n} (\overline{C_2} - C_{2j})^2 / (n-1)}$$

where $\overline{YY}$, $\overline{C_1}$, and $\overline{C_2}$ are averages in the YY, $C_1$, and $C_2$ planes, respectively, and n is a series of frequency distribution in each plane, and is a dynamic range that varies dynamically.

Likewise, standard deviations are calculated for the background area by:

$$\sigma \cdot Ryy = \sqrt{\sum_{j=1}^{n} (\overline{YY} - YY_j)^2 / (n-1)} \quad (19)$$

$$\sigma \cdot Rc1 = \sqrt{\sum_{j=1}^{n} (\overline{C_1} - C_{1j})^2 / (n-1)}$$

$$\sigma \cdot Rc2 = \sqrt{\sum_{j=1}^{n} (\overline{C_2} - C_{2j})^2 / (n-1)}$$

where $\overline{YY}$, $\overline{C_1}$, and $\overline{C_2}$ are averages in the YY, $C_1$, and $C_2$ planes, respectively, and n is a series of frequency distribution in each plane, and is a dynamic range that varies dynamically.

The calculated standard deviations $\sigma$. Syy, $\sigma$. Sc1, $\sigma$. Sc2, $\sigma$. Ryy, $\sigma$. Rc1, and $\sigma$. Rc2 are determined as the characteristic values of the original image data.

According to this embodiment, the standard deviations of the original image data are employed as its characteristic values. However, a variety of statistics such as an average, a median, and a mode, are also employable.

Figure 17:
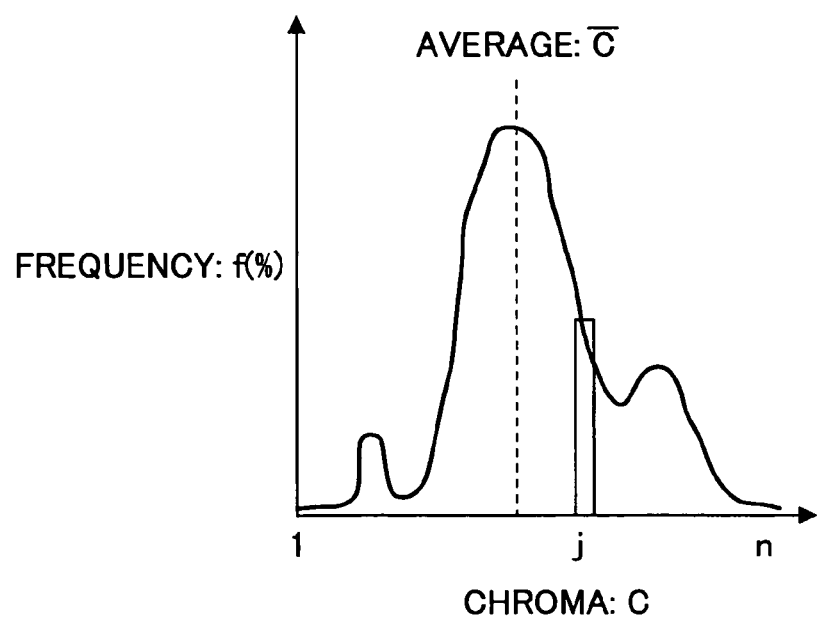
FIG. 17 is a schematic graph of a frequency distribution of chroma in a chroma plane according to the third embodiment of the present invention.

(b) A frequency distribution is calculated with respect to the mapped points of each of the YY, C, and H planes into which each pixel point belonging to the skin-colored area of the original image data is mapped after being subjected to YCC conversion and further converted into chroma (C) and hue (H) by Equation (17). FIG. 17 is a schematic graph of the frequency distribution of the chroma (C) plane. The horizontal axis represents chroma (C), and the vertical axis represents the frequency f (%) of chroma (C).

Then, a standard deviation ($\rho$. Sc) in the chroma of the skin-colored area is calculated from a chroma (value) $C_j$ at a chroma point j and the average of the chroma values (a chroma average). Likewise, a standard deviation in each of the hue H and luminance YY planes is calculated. The standard deviations are calculated by:

$$\rho \cdot Syy = \sqrt{\sum_{j=1}^{n} (\overline{YY} - YY_j)^2 / (n-1)} \quad (20)$$

-continued $$\rho \cdot Sc = \sqrt{\sum_{j=1}^{n} (\overline{C} - C_j)^2 / (n-1)}$$

$$\rho \cdot Sh = \sqrt{\sum_{j=1}^{n} (\overline{H} - H_j)^2 / (n-1)}$$

where $\overline{C}$, $\overline{H}$, and $\overline{YY}$ are averages in the C, H, and YY planes, respectively, and n is a series of frequency distribution in each plane, and is a dynamic range that varies dynamically.

Likewise, standard deviations are calculated for the background area by:

$$\rho \cdot Ryy = \sqrt{\sum_{j=1}^{n} (\overline{YY} - YY_j)^2 / (n-1)} \quad (21)$$

$$\rho \cdot Rc = \sqrt{\sum_{j=1}^{n} (\overline{C} - C_j)^2 / (n-1)}$$

$$\rho \cdot Rh = \sqrt{\sum_{j=1}^{n} (\overline{H} - H_j)^2 / (n-1)}$$

where $\overline{C}$, $\overline{H}$, and $\overline{YY}$ are averages in the C, H, and YY planes, respectively, and n is a series of frequency distribution in each plane, and is a dynamic range that varies dynamically.

The calculated standard deviations $\rho \cdot Syy$, $\rho \cdot Sc$, $\rho \cdot Sh$, $\rho \cdot Ryy$, $\rho \cdot Rc$, and $\rho \cdot Rh$ are determined as the characteristic values of the original image data.

According to this embodiment, the standard deviations of the original image data are employed as its characteristic values. However, a variety of statistics such as an average, a median, and a mode, are also employable.

Target Value Calculation Part 207:

The target value calculation part 207 calculates the chromaticity information of a target value indicating a color to which the color of the skin-colored area of the original image data is corrected.

First, the representative color of each area is obtained. Any point in the area is employable as the representative color of the area. According to this embodiment, principal component analysis is performed on each area, and the center of the obtained principal component axis is determined as the representative color of the area.

Each pixel point of the skin-colored area extracted from the original image data by the area extraction part 203 is subjected to YCC conversion. Principal component analysis is performed on the skin-colored area after the YCC conversion. The center of the obtained principal component axis (Point S in FIG. 14) is determined as the representative color of the skin-colored area.

Likewise, each pixel point of the background area extracted from the original image data by the area extraction part 203 is subjected to YCC conversion. Principal component analysis is performed on the background area after the YCC conversion. The center of the obtained principal component axis (Point R in FIG. 14) is determined as the representative color of the background area.

Further, the chromaticity point (Point P in FIG. 14) of a preferable color for the skin color is read from the storage part 209.

Next, the chromaticity point (Point Q) of the target value is calculated from Points R and P and the characteristic values of the skin-colored area and the background area obtained in the characteristic value calculation part 103.

For instance, the distance |PR| between Points P and R is calculated by:

$$|PR| = \sqrt{(C_{1P} - C_{1R})^2 + (C_{2P} - C_{2R})^2} \quad (22)$$

where $C_{1P}$ and $C_{2P}$ are the coordinate values of $C_1$ and $C_2$, respectively, at Point P, and $C_{1R}$ and $C_{2R}$ are the coordinate values of $C_1$ and $C_2$, respectively, at Point R.

Next, Point Q (distant from Point P by Th) on the segment PR connecting Points P and R is calculated as a target value for correcting the preferable skin color in accordance with the color of the background area.

Next, a description is given of a method of calculating a correction for each of the above-described methods (a) and (b) of calculating the characteristic values the skin-colored area and the background area according to the characteristic value calculation part 205.

A Method of Calculating a Correction (Th) Based on the Characteristic Values According to the Above-described Method (a):

The relationship between corrections and the characteristic values of the skin-colored area and the background area is prestored in an LUT. A correction Th corresponding to the characteristic values of the skin-colored area ($\sigma$. Syy, $\sigma$. Sc1, and $\sigma$. Sc2) and the characteristic values of the background area ($\sigma$. Ryy, $\sigma$. Rc1, and $\sigma$. Rc2) calculated by the method (1) is calculated, referring to the LUT.

Figure 18:
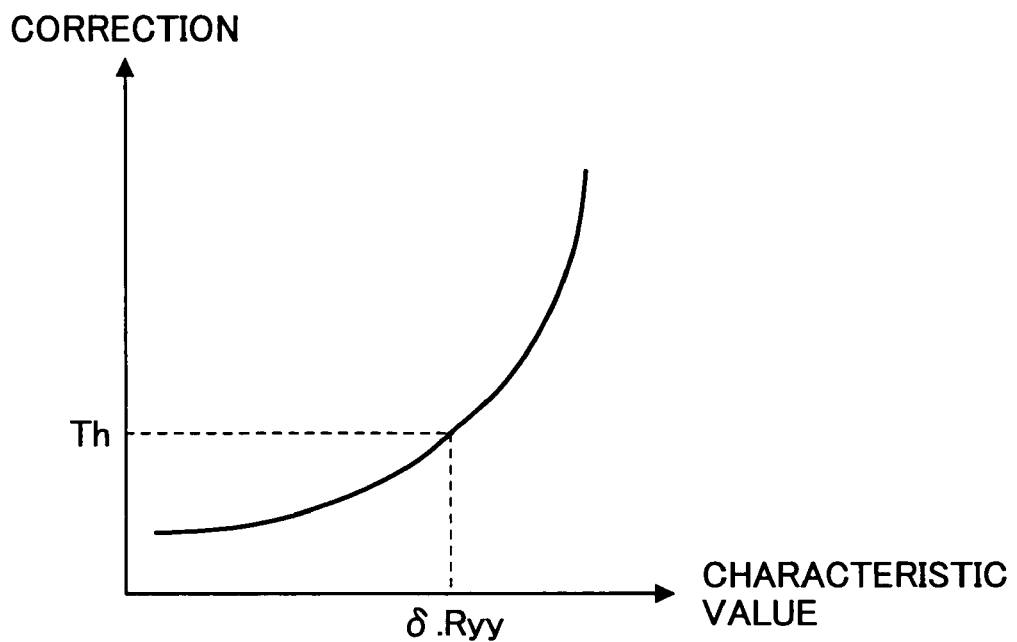
FIG. 18 is a graph for illustrating the calculation of the correction from the characteristic value relating to the luminance of the background area according to the third embodiment of the present invention.

For instance, FIG. 18 shows an LUT showing the relationship between characteristic value (the standard deviation of luminance YY) and correction in a general background area. When a characteristic value $\sigma$. Ryy is given, the corresponding correction Th is calculated.

That is, when the luminance of the background area has a broad distribution as in the case of, for instance, a landscape image where a large quantity of luminance information is employed, the calculated correction Th is low. On the other hand, in the case of, for instance, a portrait of a single color background, the calculated correction Th is high.

That is because when the information of the background area is small in quantity, a correction is increased, and when the background area has a large quantity of information, a correction is reduced since emphasis is not put on the reproducibility of the skin color.

According to this embodiment, the luminance distribution of the background area is employed. However, this is only an example, and the luminance, $C_1$, and $C_2$ components of the background area, and the luminance, $C_1$, and $C_2$ components of the skin-colored area is employable individually or in an appropriate combination.

A Method of Calculating a Correction (Th) Based on the Characteristic Values According to the Above-described Method (b):

The relationship between corrections and the characteristic values of the skin-colored area and the background area is prestored in an LUT. A correction Th corresponding to the characteristic values of the skin-colored area ($\rho$. Syy, $\rho$. Sc, and $\rho$. Sh) and the characteristic values of the background area (ρ. Ryy, ρ. Rc, and ρ. Rh) calculated by the method (1) is calculated, referring to the LUT.

Figure 19:
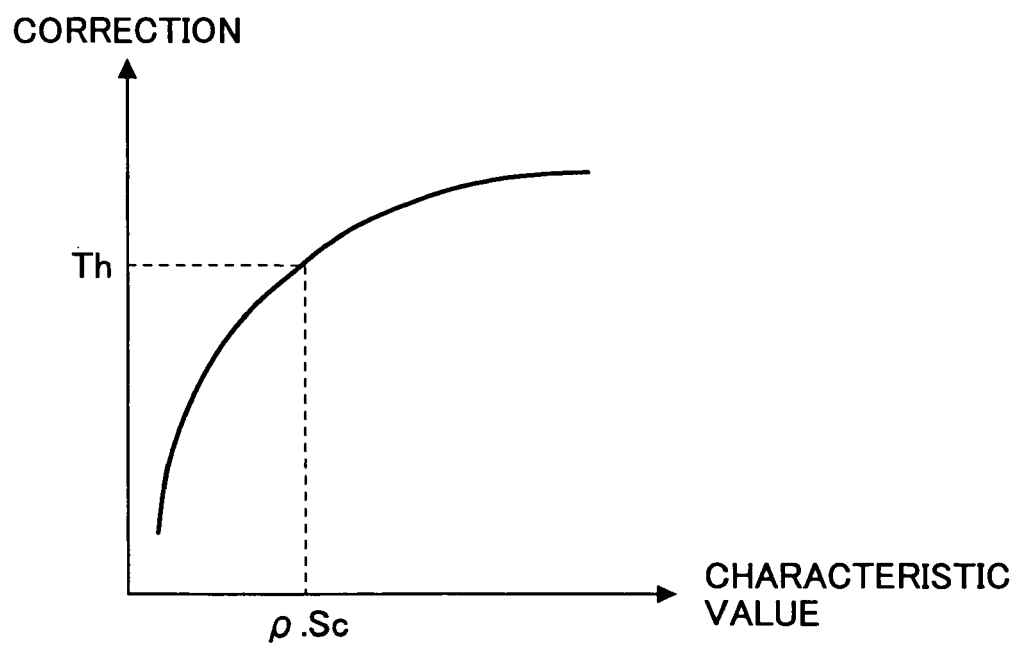
FIG. 19 is a graph for illustrating the calculation of the correction from the characteristic value relating to the chroma of the skin-colored area according to the third embodiment of the present invention.

For instance, FIG. 19 shows an LUT showing the relationship between characteristic value (the standard deviation of chroma C) and correction in a general skin-colored area. When a characteristic value ρ. Sc is given, the corresponding correction Th is calculated.

That is, when the percentage of the skin-colored area in the original image data is high, the calculated correction Th is high. In the opposite case, the calculated correction Th is low.

This is because when the skin-colored area is wide, emphasis is put on the reproducibility of the skin color, and when the skin-colored area is small, the influence of the reproducibility of the skin color over image quality is limited.

According to this embodiment, the chroma distribution of the skin-colored area is employed. However, this is only an example, and the luminance, chroma, and hue components of the skin-colored area and the luminance, chroma, and hue components of the background area is employable individually or in an appropriate combination.

The method of calculating the correction Th is not limited to a method that calculates the correction Th directly by previously calculating the correction of a preferable color for a characteristic value and storing the relationship in a memory such as an LUT. The correction Th may be calculated from a function expressing the relationship between the correction of a preferable color and a characteristic value. This makes it possible to realize a configuration that performs a variety of processing.

Image Data Correction Part 211:

The image data correction part 211 performs color correction by shifting the representative color (Point S) of the skin-colored area (S range) to the target value (Point Q) and shifting the other chromaticity points included in the skin-colored area in the same manner in the YCC color space (FIG. 14).

Referring to FIG. 14, with respect to each chromaticity point $S_i$ in the skin-colored area (S range), a chromaticity point $S_i'$ to which the chromaticity point $S_i$ is shifted by a distance |SQ| in the direction from Point S to Point Q is calculated. Then, the chromaticity points $S_i$ and $S_i'$ are inversely converted from YCC color space values into RGB color space values by Equation (16). The pixel data of the original image data which pixel data has the same value as the RGB value into which the chromaticity point $S_i$ is inversely converted is replaced by the RGB value into which the chromaticity point $S_i'$ is inversely converted. This processing is performed on every chromaticity point $S_i$ included in the skin-colored area (S range), thereby correcting the skin color of the original image data.

In the above-described case, the pixels in the skin-colored area are simply shifted uniformly by the distance |SQ|. Alternatively, the pixels may be moved based on a predetermined function that decreases a correction for a pixel in the specific color area as the position of the pixel comes closer to the background area.

According to the above-described configuration, a specific color (for instance, a human skin color) may be corrected in accordance with its peripheral area so that a preferable color is always obtained.

Fourth Embodiment

A description is given of a fourth embodiment of the present invention.

In the fourth embodiment, the color correction unit 200 of the third embodiment obtains a preferable color by reading the attribute information of an image.

Figure 20:
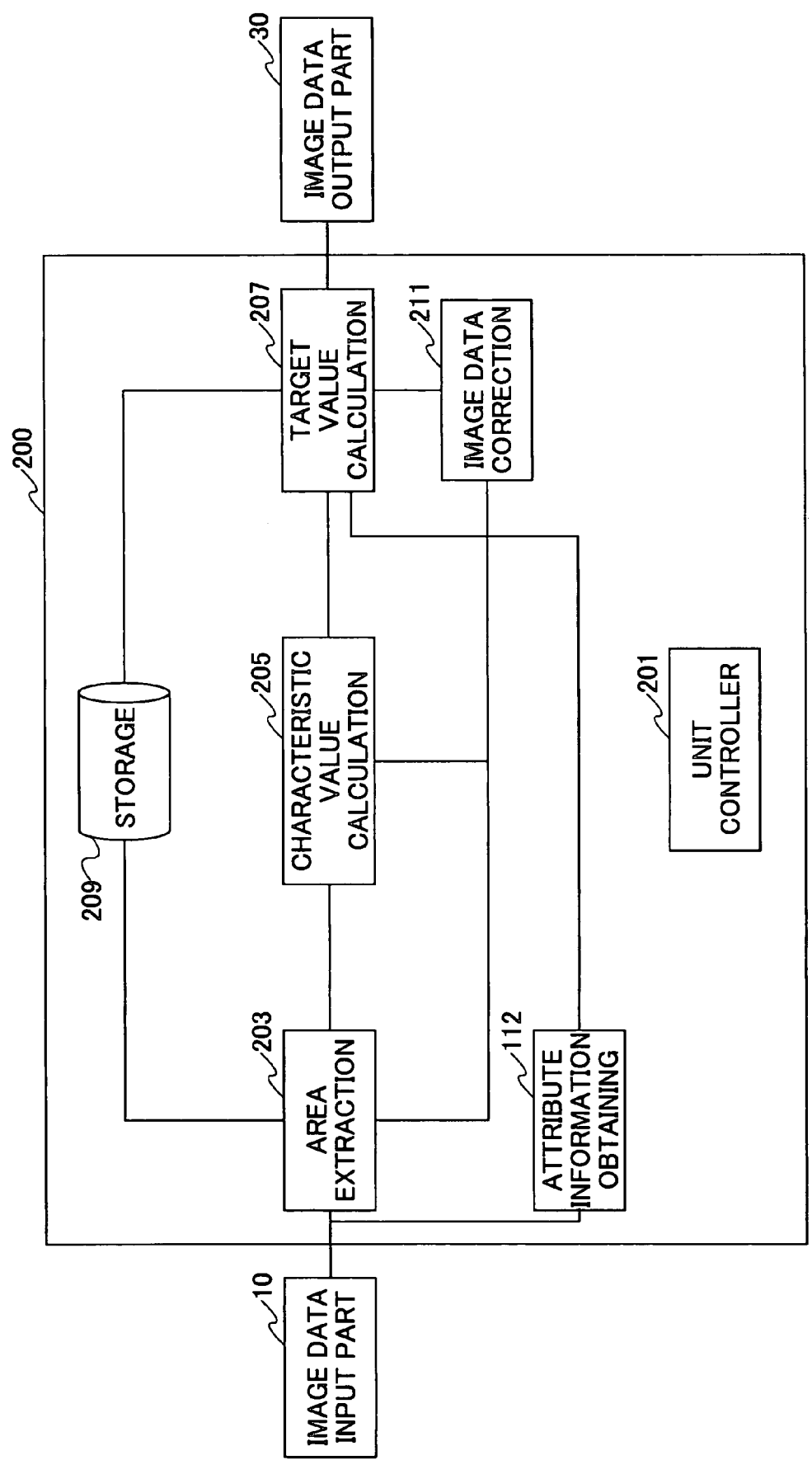
FIG. 20 is a block diagram showing a configuration of the image processing apparatus according to a fourth embodiment of the present invention.

FIG. 20 is a block diagram showing a configuration of the image processing apparatus according to the fourth embodiment of the present invention. Referring to FIG. 20, image data is input from the image data input part 10, subjected to color correction in the color correction unit 200, and output from the image data output part 30.

The color correction unit 200 includes the unit controller 201, the area extraction part 203, the characteristic value calculation part 205, the attribute information obtaining part 112, the target value calculation part 207, the storage part 209, and the image data correction part 211.

The unit controller 201 controls the entire color correction unit 200. The area extraction part 203 extracts a specific color area to be subjected to color correction and its background area included in the image data input from the image input part 10, which is hereinafter also referred to as the original image data, referring to the range of a memory color stored in the storage part 209. The characteristic value calculation part 205 calculates the characteristic values of the extracted specific color area and background area. The attribute information obtaining part 112 obtains the attribute information of the original image data. The target value calculation part 207 calculates the target value of the specific color area in accordance with the characteristic values obtained from the characteristic value calculation part 205 based on the characteristic values, the range of the memory color obtained from the storage part 209, and the attribute information of the original image data obtained from the attribute information obtaining part 112. The image data correction part 211 performs color correction on the specific color area extracted in the area extraction part 203 based on the calculated target value.

In FIG. 20, the elements having the same functions as in the third embodiment (FIG. 13) are referred to by the same numerals, and with respect to those elements, only a difference from the third embodiment is described.

Target Value Calculation Part 207:

A description is given, with reference to FIG. 21, of a method of calculating a correction (Th). FIG. 21 is a correction factor table showing a correction factor for the correction (Th) of the skin-colored area with respect to a given scene capture type value. Image data correction is performed using a value obtained by multiplying the correction Th obtained by the target value calculation part 207 of the third embodiment by the correction factor.

That is, when a portrait is captured (this case corresponds to Type 2 of FIG. 21), the correction factor is calculated to be 0.5. That is, in this case, the correction factor is calculated to be a value higher than that for STANDARD (corresponding to Type 0 of FIG. 21). This is because when a portrait is captured, a correction is increased since emphasis is put on the reproducibility of a skin-colored area in the image data.

A method of calculating the correction factor is not limited to the above-described method that refers to the correction factor table. The correction factor may also be suitably calculated by a prepared function based on the image attribute information. Further, not only a luminance component but also a chroma or hue component is employable as the correction Th.

Figure 22:
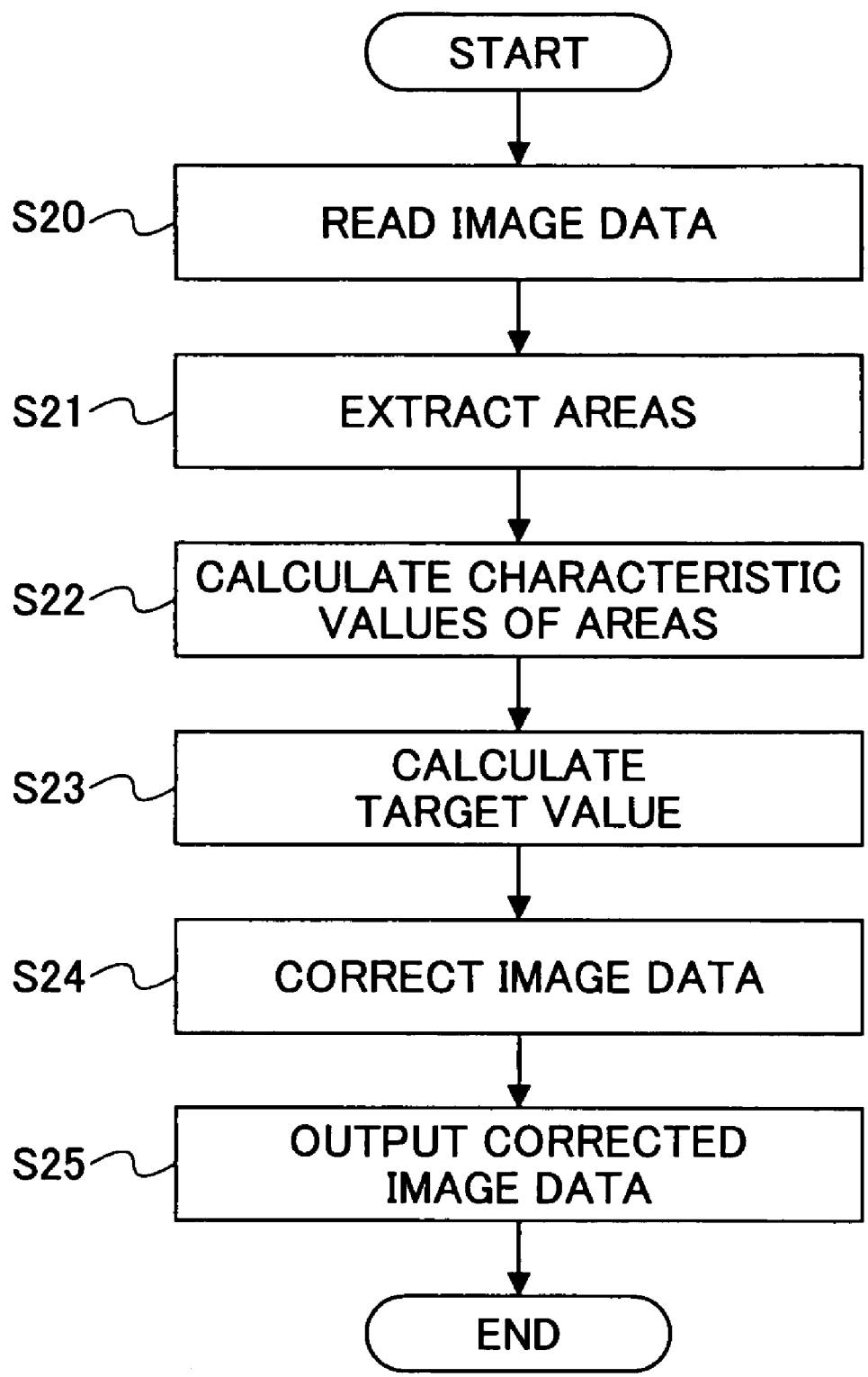
FIG. 22 is a flowchart showing a procedure for correction in the image processing apparatus according to the third and fourth embodiments of the present invention.

Next, a description is given, with reference to FIG. 22, of a procedure for correcting the original image data in the image processing apparatus according to the third and fourth embodiments.

First, in step S20 of FIG. 22, image data is input from outside via a network or from an apparatus such as a hardware disk drive, a flexible disk drive, an optical recording medium reader, a scanner, or a digital camera. When the input image data is an analog signal, the image data is converted into a digital signal. Thereafter, the image data is subjected to predetermined digital processing, and is output as digital signals of R (red), G (green), and B (blue).

Next, in step S21, the data of each pixel of the original image data is converted from chromaticity coordinate values of the RGB color space into chromaticity coordinate values of the YCC color space by Equation (16). The converted image data is compared with the range of the skin color (specific color) prestored in the storage part 209. Thereby, the specific color area (skin-colored area) existing in the original image data is extracted. An area formed around the skin-colored area in an ellipsoid obtained by increasing the range (dimensions) of the skin-colored area by several times of the length of the short-axis is defined as the background area of the specific color area.

Next, in step S22, the characteristic values of the extracted skin-colored area and background area are calculated. The characteristic values may be calculated by one of the following two methods:

(a) A frequency distribution is calculated with respect to the mapped points of each of the YY, $C_1$, and $C_2$ planes into which each pixel point belonging to the skin-colored area of the original image data is mapped by YCC conversion. The standard deviations in the planes of the skin-colored area are calculated by Equation (18) to be employed as the characteristic values of the skin-colored area. Likewise, the standard deviations in the planes of the background area are calculated by Equation (19) to be employed as the characteristic values of the background area.

(b) A frequency distribution is calculated with respect to the mapped points of each of the YY, C, and H planes into which each pixel point belonging to the skin-colored area of the original image data is mapped after being subjected to YCC conversion and further converted into chroma (C) and hue (H) by Equation (17). The standard deviations in the planes of the skin-colored area are calculated by Equation (20) to be employed as the characteristic values of the skin-colored area. Likewise, the standard deviations in the planes of the background area are calculated by Equation (21) to be employed as the characteristic values of the background area.

Next, in step S23, the chromaticity information of a target value indicating a color to which the color of the skin-colored area of the original image data is corrected is calculated.

First, principal component analysis is performed on each of the skin-colored area and the background area. The centers of the obtained principal component axes of the skin-colored area and the background area are obtained as their respective representative colors (Points S and R in FIG. 14).

Next, the chromaticity point (Point P in FIG. 14) of a preferable color for the specific color (skin color) is read out from the storage part 209. The chromaticity point (Point Q, distant from Point P by Th) of the target value is calculated from Points R and P and the characteristic values of the original image data.

If the image attribute information added to the original image data has been obtained at this point, a correction factor α according to the image attribute information is obtained from the correction factor table. The correction Th is multiplied by the correction factor α to be determined as the final correction.

Then, in step S24, color correction is performed by shifting the representative color (Point S) of the skin-colored area (S area) to the target value (Point Q) and shifting the other chromaticity points included in the skin-colored area in the same manner in the YCC color space.

With respect to each chromaticity point $S_i$ in the skin-colored area (S range), a chromaticity point $S_i'$ to which the chromaticity point $S_i$ is shifted by a distance |SQ| in the direction from Point S to Point Q is calculated. Then, the chromaticity points $S_i$ and $S_i'$ are inversely converted from YCC color space values into RGB color space values by Equation (16). The pixel data of the original image data which pixel data has the same value as the RGB value into which the chromaticity point $S_i$ is inversely converted is replaced by the RGB value into which the chromaticity point $S_i'$ is inversely converted. This processing is performed on every chromaticity point $S_i$ included in the skin-colored area (S range), thereby correcting the skin color of the original image data.

In step S25, the corrected image data obtained by performing color correction on the original image data is output to a printer, a multi-function apparatus, a facsimile machine, or a storage device such as a hard disk unit or an optical recording medium recorder. Alternatively, the corrected image data may be output to outside via a network.

Other Embodiments

Any of the following configurations is employable in the present invention for performing desired color correction on image data.

(a) A computer is provided between an image input device and an image output device. The computer performs color correction on read image data, and then, the corrected image data is output.

(b) A color correction unit performing desired color correction is incorporated into a digital camera. An image is displayed on a print or a liquid crystal panel using the converted image data.

(c) A color correction unit performing desired color correction is incorporated into a printer. Image data input directly is subjected to the desired color correction, and is printed out.

Further, the functions of the apparatus of each of the above-described embodiments are previously written to a recording medium such as a ROM or a CD-ROM as a program. The recording medium is loaded into an image processing apparatus so that the program is executed by a micro processor. Thereby, the objects of the present invention are achieved.

In this case, the program read out from the recording medium realizes the above-described embodiments. Accordingly, the program and the recording medium on which the program is recorded are also included in the present invention.

The recording medium may be a semiconductor medium such as a ROM or a nonvolatile memory card, an optical medium such as a DVD, a MO disk, an MD, or a CD-R, or a magnetic medium such as a magnetic tape or a flexible disk.

Alternatively, the program may be stored in the storage device of a server computer and supplied directly therefrom via a communication network such as the Internet. In this case, the storage device of the server computer is also included in the recording medium of the present invention.

Further, the functions of the above-described embodiments are realized by not only executing the loaded program, but also performing processing in cooperation with an operating system or another application program based on the instructions of the program.

Further, in the case of providing use by an ASP (application service provider) that stores the above-described program in the storage device of a server computer, such as a magnetic disk, executes the program upon receiving an execution instruction from a user computer connected via a communication line such as the Internet, and returns the execution results to the user computer, the storage device of the server computer and the program are also included in the present invention.

By thus distributing the functions according to the above-described embodiments in the form of a program, costs, portability, and versatility can be improved.

The present invention is not limited to the specifically disclosed embodiments, and variations and modifications may be made without departing from the scope of the present invention.

The present application is based on Japanese priority applications No. 2002-348384, filed on Nov. 29, 2002, and No. 2003-376443, filed on Nov. 6, 2003, the entire contents of which are hereby incorporated by reference.

What is claimed is:

1. An apparatus for performing image processing on image data, comprising:
   a characteristic value calculation part calculating a characteristic value from the image data;
   an area extraction part extracting a specific color area of a specific color and a background area thereof from the image data, using the characteristic value and color information of a memory color stored in a storage part;
   a target value calculation part calculating a target value for correcting a preferable color of the specific color from the characteristic value, the extracted specific color and background areas, and color information of the preferable color stored in the storage part; and
   an image data color correction part calculating an amount of correction for correcting the preferable color based on the calculated target value and the characteristic value, and correcting a color of the specific color area based on the calculated amount of correction and the characteristic value,
   wherein said target value calculation part sets an intersection of a straight line and an ellipsoid as the target value of the preferable color, the straight line being parallel to a segment connecting chromaticity coordinates of the background area and an origin, and passing through chromaticity coordinates of the preferable color of the specific color, the ellipsoid being formed by a range of the preferable color of the specific color.

2. The apparatus as claimed in claim 1, further comprising an attribute information obtaining part obtaining attribute information added to the image data,
   wherein said image data color correction part corrects the color of the specific color area based further on the obtained attribute information.

3. The apparatus as claimed in claim 2, wherein the attribute information obtaining part obtains information on a condition for capturing the image data as the attribute information, the condition being one of a scene capture type, an F number, a shutter speed, white balance, and presence or absence of a flash.

4. The apparatus as claimed in claim 3, wherein said image data color correction part corrects the color of the specific color area by multiplying the calculated correction by a correction factor set according to the condition for capturing the image data.

5. The apparatus as claimed in claim 1, wherein said characteristic value calculation part splits the image data into a plurality of regions, and calculates, for each region, at least one of an average, a median, a mode, and a standard deviation in color information, and a percentage of the region in the image data.

6. The apparatus as claimed in claim 1, wherein the color information of the preferable color of the memory color stored in the storage part comprises chromaticity coordinates in a color space and a range of the chromaticity coordinates.

7. The apparatus as claimed in claim 1, wherein said image data color correction part corrects chromaticity coordinates of the specific color area of the image data by a predetermined distance calculated based on the characteristic value of the image data along an axis formed by the target value and the characteristic value of the specific color area.

8. The apparatus as claimed in claim 7, wherein the predetermined distance is calculated based on a percentage of the specific color area in the image data.

9. A method of performing image processing on image data, the method comprising the steps of:
   (a) calculating a characteristic value from the image data;
   (b) extracting a specific color area of a specific color and a background area thereof from the image data, using the characteristic value and color information of a memory color stored in a storage part;
   (c) calculating a target value for correcting a preferable color of the specific color from the characteristic value, the extracted specific color and background areas, and color information of the preferable color stored in the storage part; and
   (d) calculating an amount of correction for correcting the preferable color based on the calculated target value and the characteristic value, and correcting a color of the specific color area based on the calculated amount of correction and the characteristic value,
   wherein an intersection of a straight line and an ellipsoid is set in step (c) as the target value of the preferable color, the straight line being parallel to a segment connecting chromaticity coordinates of the background area and an origin, and passing through chromaticity coordinates of the preferable color of the specific color, the ellipsoid being formed by a range of the preferable color of the specific color.

10. The method as claimed in claim 9, further comprising the step of (e) obtaining attribute information added to the image data,
    wherein said (d) corrects the color of the specific color area based further on the obtained attribute information.

11. A computer readable medium tangibly embodying a program for causing a computer to perform the method as set forth in claim 9.

12. A computer-readable recording medium on which a program for causing a computer to execute a method as set forth in claim 9 is recorded.

* * * * *